US012265766B2

(12) United States Patent
Shmilovich et al.

(10) Patent No.: US 12,265,766 B2
(45) Date of Patent: Apr. 1, 2025

(54) METHODS AND APPARATUS TO IMPROVE FLUID FLOW SIMULATIONS

(71) Applicant: The Boeing Company, Chicago, IL (US)

(72) Inventors: Arvin Shmilovich, Huntington Beach, CA (US); Rene Woszidlo, Saint Charles, MO (US); Robert Narducci, Glen Mills, PA (US)

(73) Assignee: The Boeing Company, Arlington, VA (US)

( * ) Notice: Subject to any disclaimer, the term of this patent is extended or adjusted under 35 U.S.C. 154(b) by 1037 days.

(21) Appl. No.: 17/219,104

(22) Filed: Mar. 31, 2021

(65) Prior Publication Data

US 2022/0035975 A1 Feb. 3, 2022

Related U.S. Application Data

(60) Provisional application No. 63/060,383, filed on Aug. 3, 2020.

(51) Int. Cl.
| | | |
|---|---|---|
| G06F 30/28 | (2020.01) | |
| G06F 111/04 | (2020.01) | |
| G06F 113/06 | (2020.01) | |
| G06F 113/08 | (2020.01) | |

(52) U.S. Cl.
CPC .......... *G06F 30/28* (2020.01); *G06F 2111/04* (2020.01); *G06F 2113/06* (2020.01); *G06F 2113/08* (2020.01)

(58) Field of Classification Search
CPC ...... G06F 30/00; G06F 30/28; G06F 2111/04; G06F 2113/06; G06F 2113/08

USPC .......................................................... 703/6
See application file for complete search history.

(56) References Cited

U.S. PATENT DOCUMENTS

| | | | |
|---|---|---|---|
| 6,505,326 | B1 | 1/2003 | Farral et al. |
| 7,100,875 | B2 | 9/2006 | Shmilovich et al. |
| 7,195,180 | B2 | 3/2007 | Lee |
| 7,255,309 | B2 | 8/2007 | Boldrin et al. |
| 7,437,014 | B2 | 10/2008 | Kim |

(Continued)

OTHER PUBLICATIONS

Shmilovich, Arvin et al., "Strategies for Practical Implementations of Low-Input Thermal Flow Control", Jan. 7-11, 2019, AIAA SciTech Forum, American Institute of Aeronautics and Astronautics. (Year: 2019).*

*Primary Examiner* — Cedric Johnson
(74) *Attorney, Agent, or Firm* — Hanley, Flight & Zimmerman, LLC

(57) ABSTRACT

Methods, apparatus, systems, and articles of manufacture are disclosed to improve fluid flow simulations. An example apparatus includes a property identifier to, prior to execution of the computer-based model, identify donors and recipients representative of one or more model regions of the computer-based model to simulate for a plurality of time steps including a first time step and a second time step, the donors having donor properties, in response to computing a flow field for the first time step of the computer-based model, a property extractor to extract the donor properties from extraction surfaces of the donors, and a property assignor to assign the donor properties to boundary surfaces of respective ones of the recipients, and a flow field generator to generate an output flow field for the second time step based on the recipients having the assigned donor properties.

21 Claims, 22 Drawing Sheets

(56) References Cited

U.S. PATENT DOCUMENTS

| | | |
|---|---|---|
| 7,597,289 B2 | 10/2009 | Shmilovich et al. |
| 7,647,211 B2 | 1/2010 | Drumheller |
| 7,661,629 B2 | 2/2010 | Shmilovich et al. |
| 7,874,525 B2 | 1/2011 | Miller et al. |
| 8,016,244 B2 | 9/2011 | Shmilovich et al. |
| 8,706,461 B1 | 4/2014 | Cary et al. |
| 9,193,436 B2 | 11/2015 | Bernhardt |
| 10,308,350 B2 | 6/2019 | Shmilovich et al. |
| 10,366,182 B2 | 7/2019 | Mani et al. |
| 2012/0173219 A1* | 7/2012 | Rodriguez .............. G06F 30/20 703/9 |
| 2018/0363491 A1 | 12/2018 | Shmilovich et al. |
| 2020/0034497 A1* | 1/2020 | Goswami ................ G06F 30/15 |

\* cited by examiner

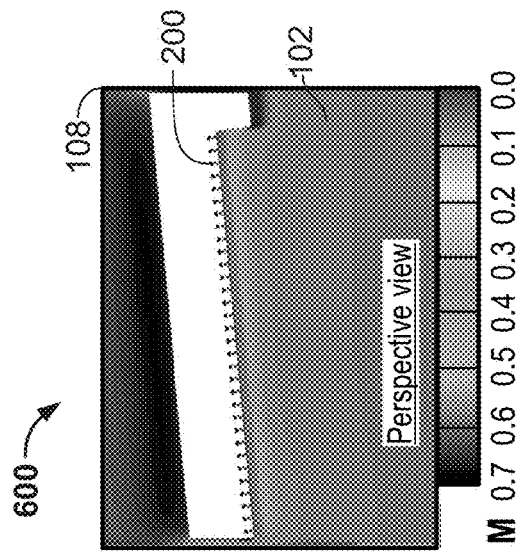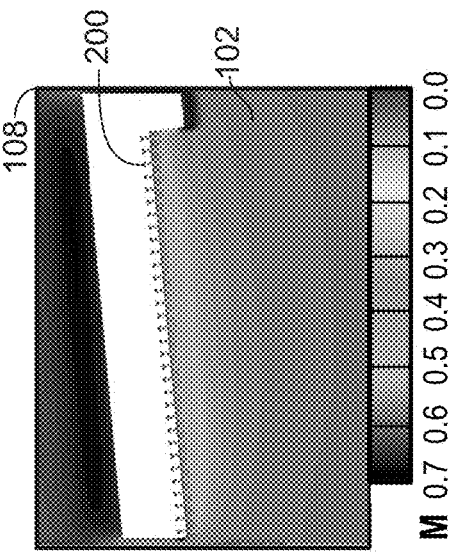
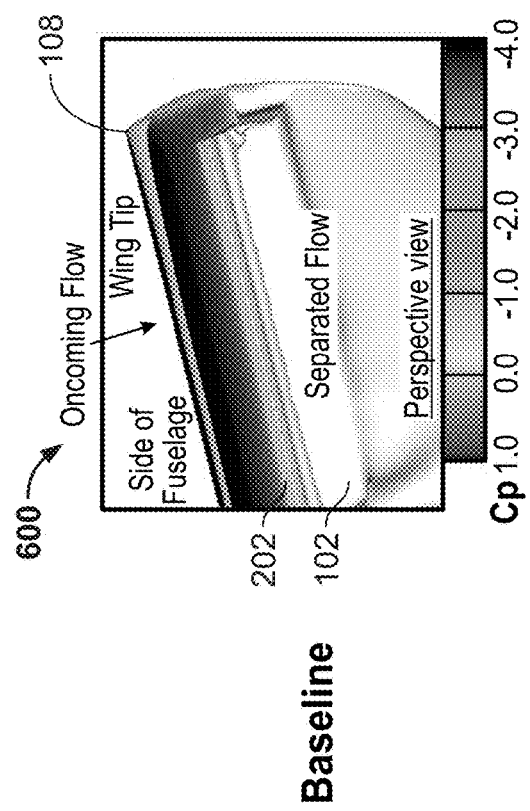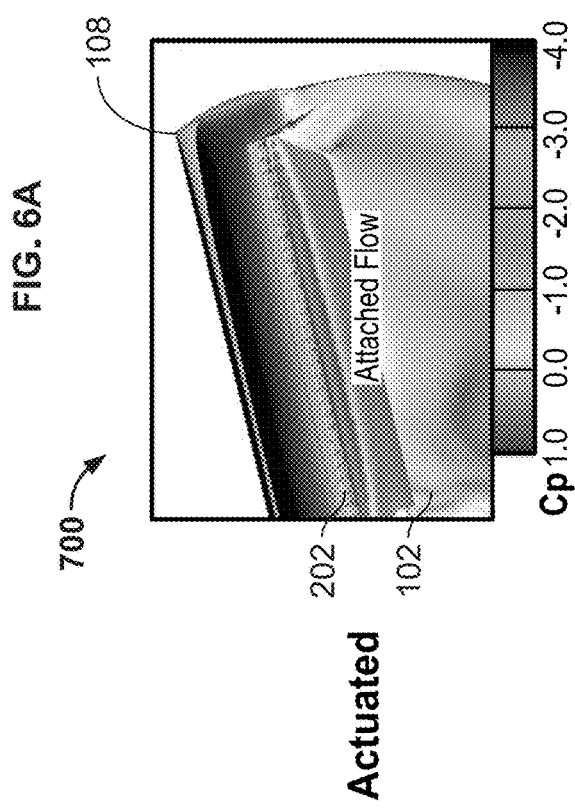

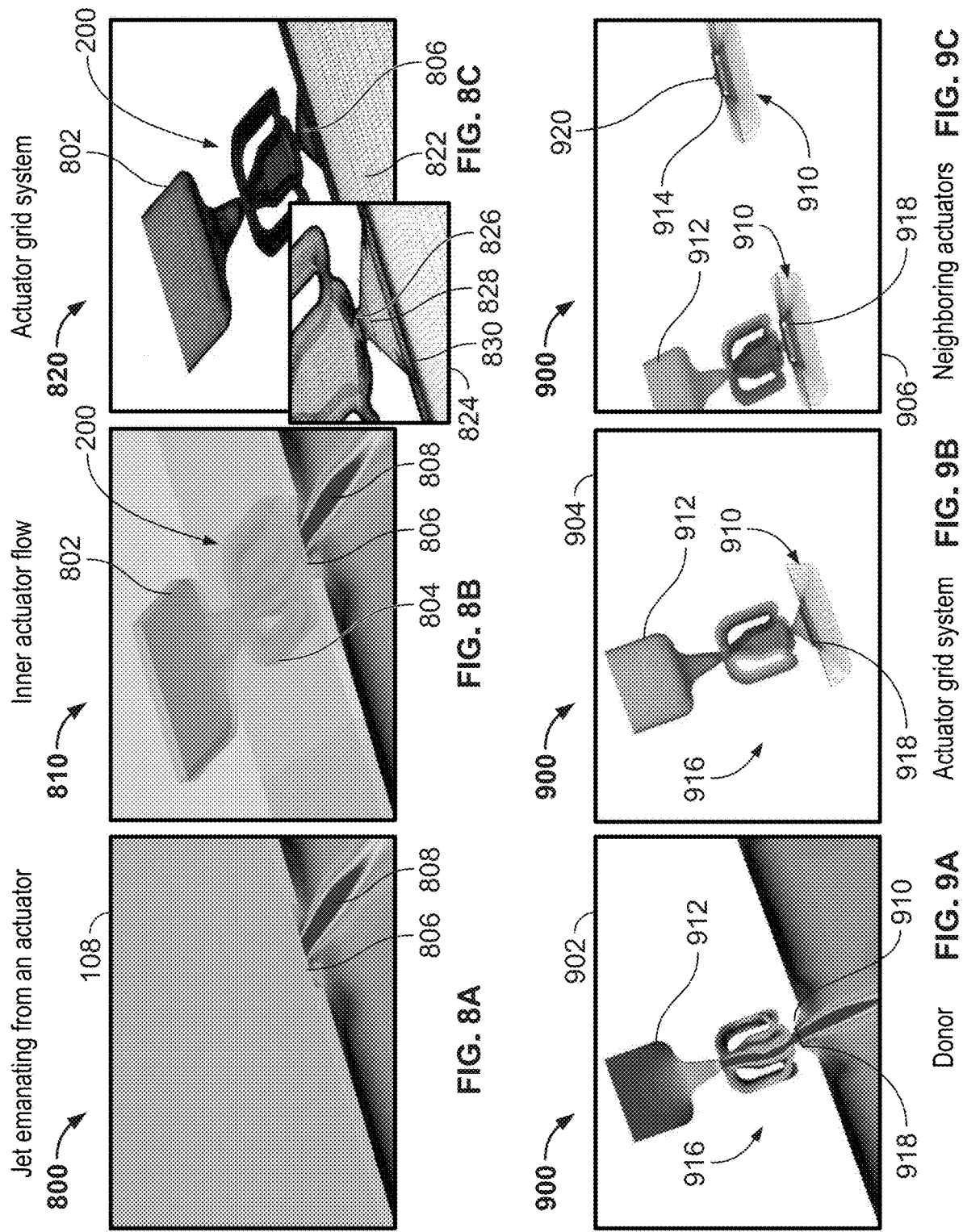

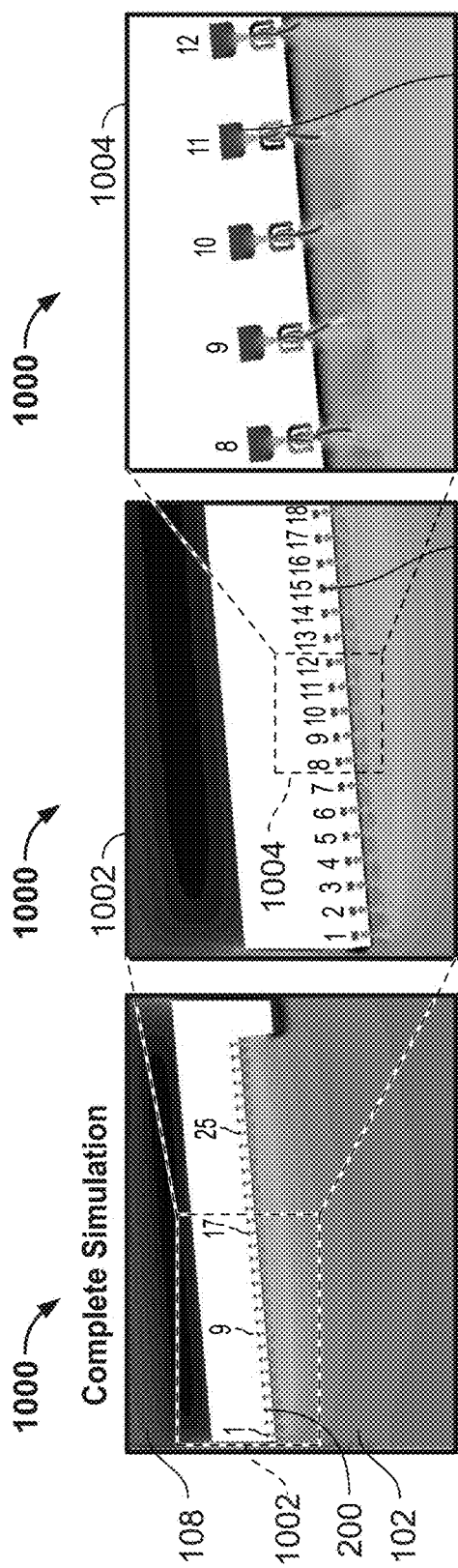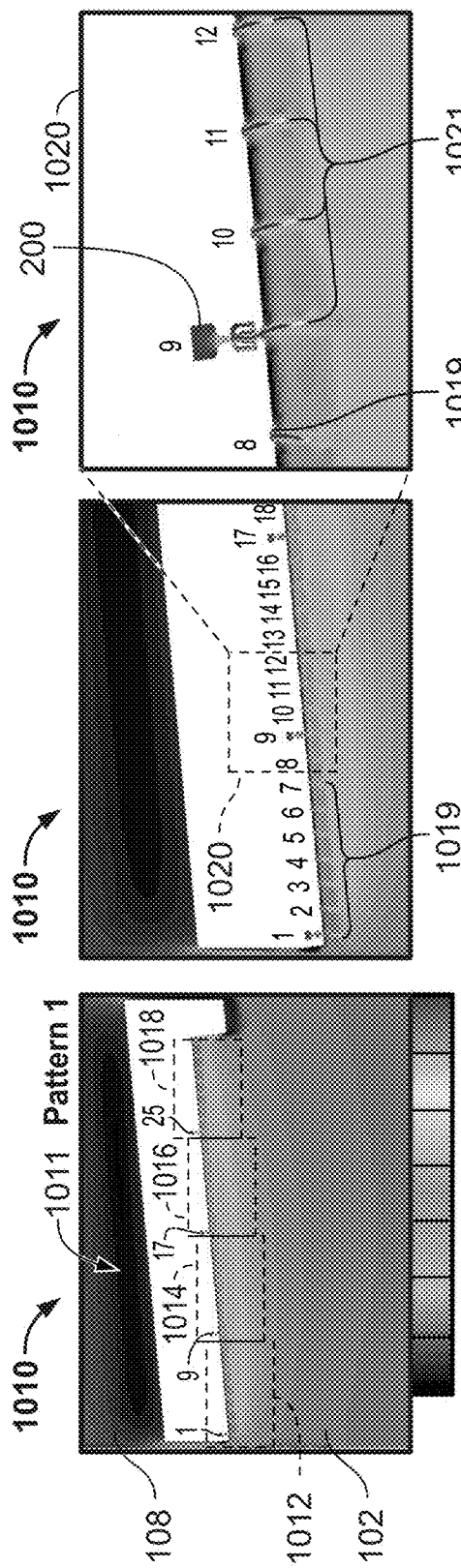
FIG. 10A FIG. 10B FIG. 10C
FIG. 10D FIG. 10E FIG. 10F

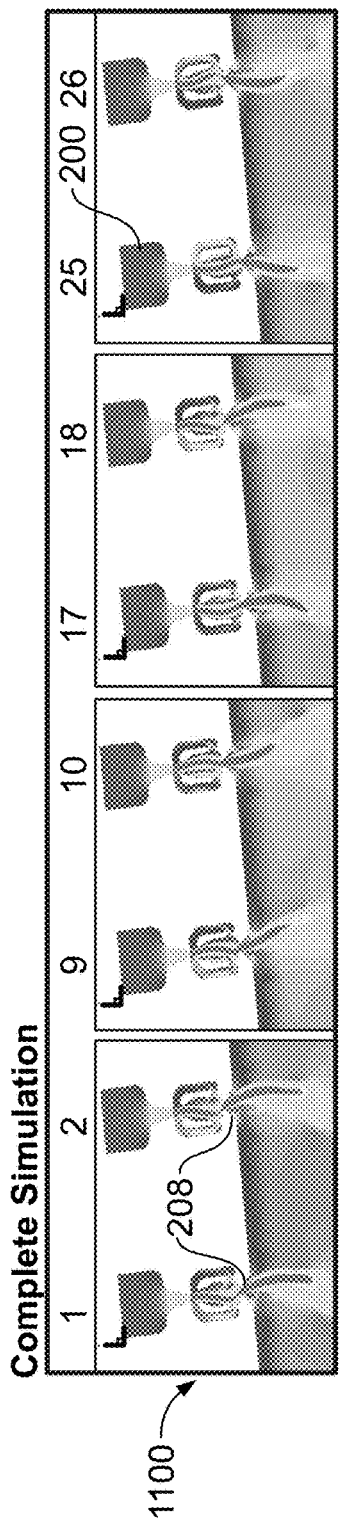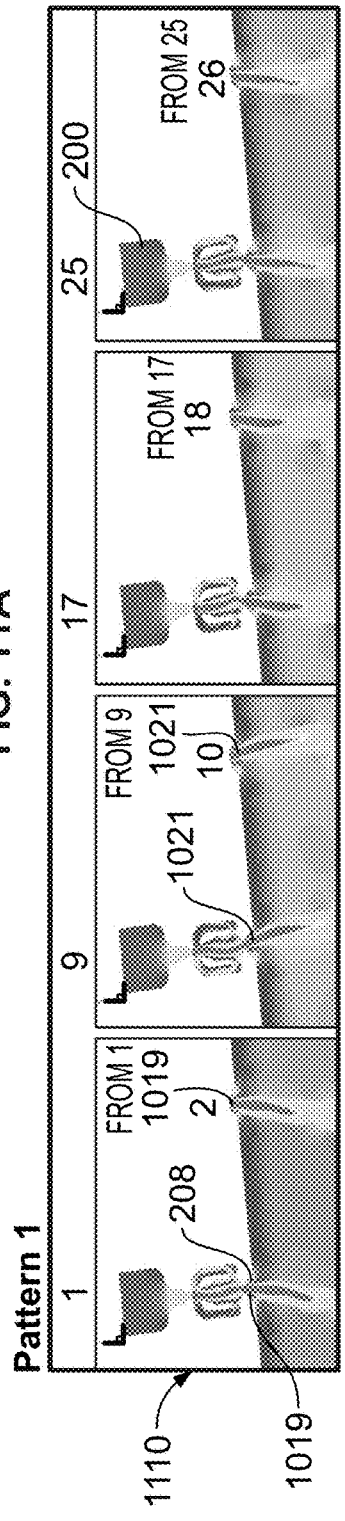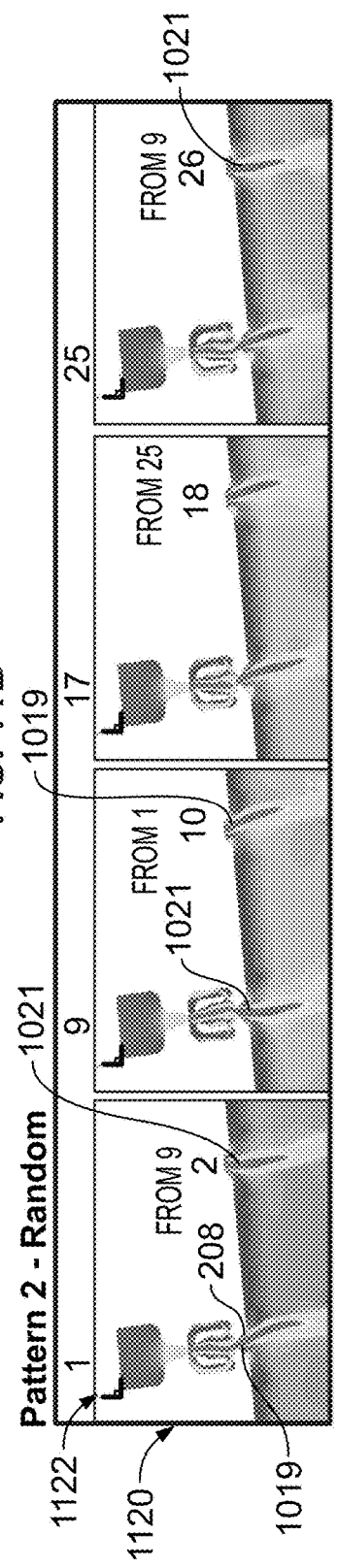

| GROUP 1 | GROUP 2 | GROUP 3 | GROUP 4 |
|---|---|---|---|
| ACTUATOR 1 = DONOR 1 | ACTUATOR 9 = DONOR 9 | ACTUATOR 17 = DONOR 17 | ACTUATOR 25 = DONOR 25 |
| ACTUATOR 2: DONOR 9 | ACTUATOR 10: DONOR 1 | ACTUATOR 18: DONOR 25 | ACTUATOR 26: DONOR 9 |
| ACTUATOR 3: DONOR 1 | ACTUATOR 11: DONOR 25 | ACTUATOR 19: DONOR 9 | ACTUATOR 27: DONOR 17 |
| ACTUATOR 4: DONOR 1 | ACTUATOR 12: DONOR 1 | ACTUATOR 20: DONOR 17 | ACTUATOR 28: DONOR 17 |
| ACTUATOR 5: DONOR 9 | ACTUATOR 13: DONOR 25 | ACTUATOR 21: DONOR 17 | ACTUATOR 29: DONOR 25 |
| ACTUATOR 6: DONOR 9 | ACTUATOR 14: DONOR 17 | ACTUATOR 22: DONOR 1 | ACTUATOR 30: DONOR 25 |
| ACTUATOR 7: DONOR 9 | ACTUATOR 15: DONOR 1 | ACTUATOR 23: DONOR 1 | ACTUATOR 31: DONOR 9 |
| ACTUATOR 8: DONOR 25 | ACTUATOR 16: DONOR 9 | ACTUATOR 24: DONOR 9 | ACTUATOR 32: DONOR 25 |

FIG. 11D

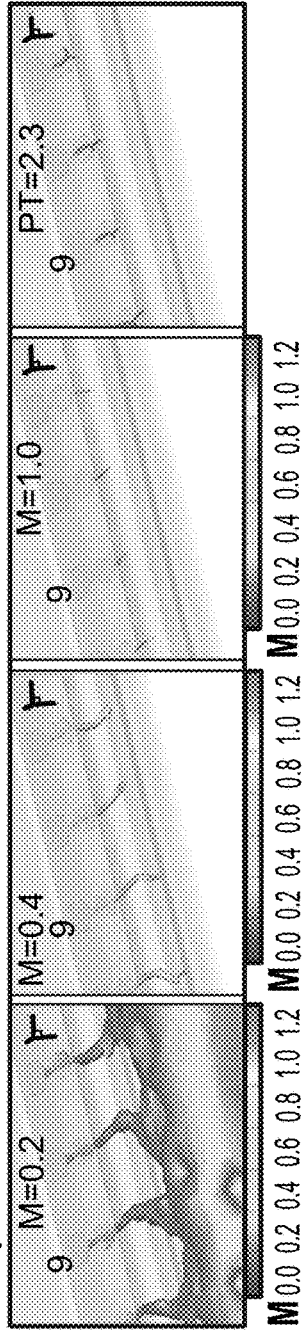
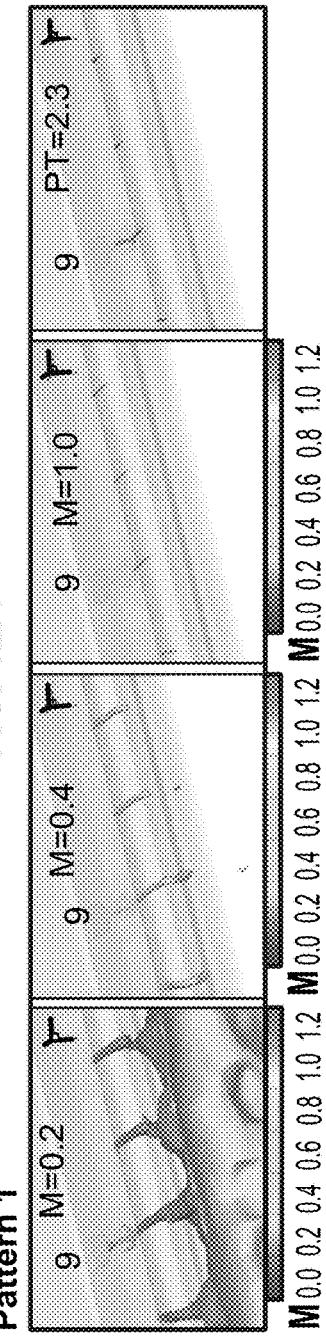
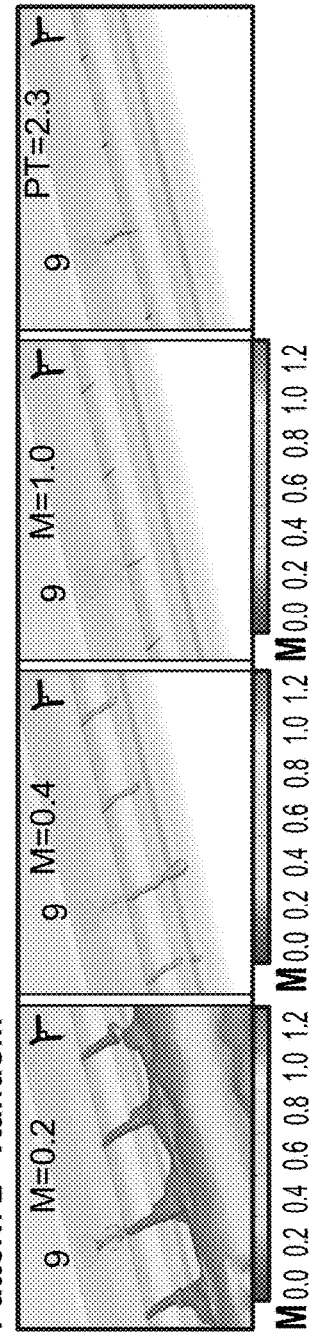
FIG. 12A
FIG. 12B
FIG. 12C

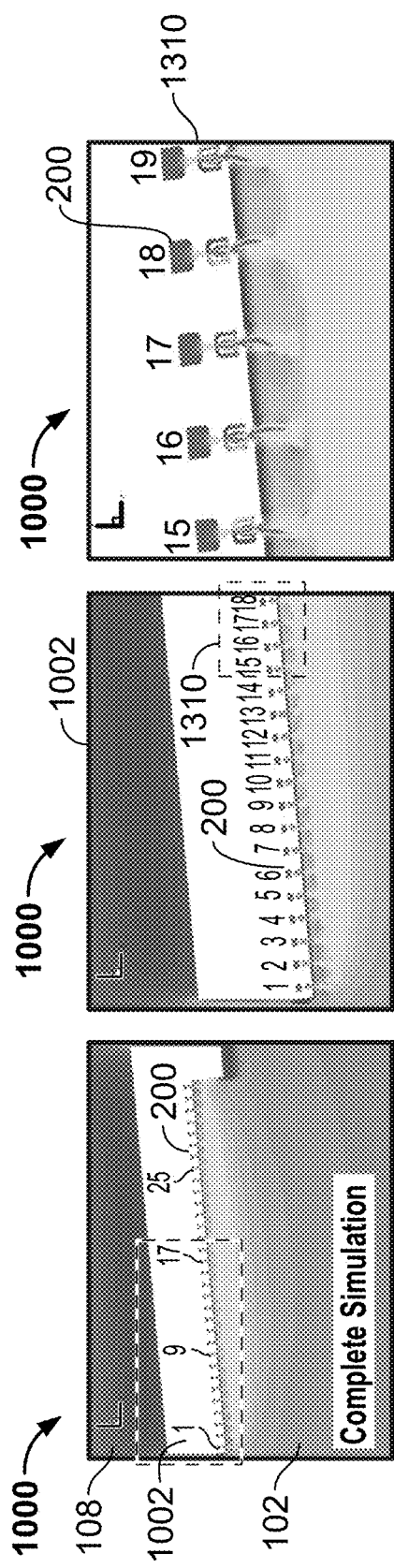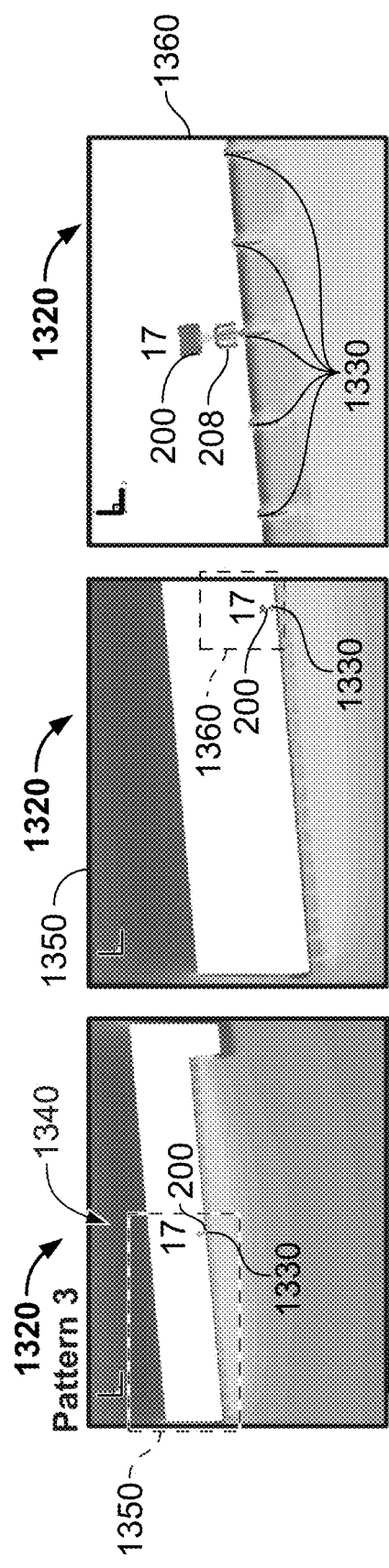
FIG. 13A  FIG. 13B  FIG. 13C
FIG. 13D  FIG. 13E  FIG. 13F

METHODS AND APPARATUS TO IMPROVE FLUID FLOW SIMULATIONS

RELATED APPLICATION

This patent arises from an application claiming the benefit of U.S. Provisional Patent Application No. 63/060,383, which was filed on Aug. 3, 2020. U.S. Provisional Patent Application No. 63/060,383 is hereby incorporated herein by reference in its entirety. Priority to U.S. Provisional Patent Application No. 63/060,383 is hereby claimed.

FIELD OF THE DISCLOSURE

This disclosure relates generally to computational modeling, and, more particularly, to methods and apparatus to improve fluid flow simulations.

BACKGROUND

Flow analysis tools that provide solutions to extremely complex flow problems are desired. Some complex flow problems relate to unsteady flow scenarios that involve powered systems and control devices, where alternative testing is extremely cost prohibitive and typically impractical. Implementation of some designs, such as aircraft system designs, may not be pursued because simulating corresponding flow scenarios are not possible due to limited computing resources.

SUMMARY

An example apparatus disclosed herein to improve execution of a computer-based model includes a property identifier to, prior to execution of the computer-based model, identify donors and recipients representative of one or more model regions of the computer-based model to simulate for a plurality of time steps including a first time step and a second time step, the donors having donor properties, in response to computing a flow field for the first time step of the computer-based model, a property extractor to extract the donor properties from extraction surfaces of the donors, and a property assignor to assign the donor properties to boundary surfaces of respective ones of the recipients, and a flow field generator to generate an output flow field for the second time step based on the recipients having the assigned donor properties.

An example non-transitory computer readable storage medium disclosed herein includes instructions that, when executed, cause a machine to identify, prior to execution of a computer-based model, donors and recipients representative of one or more model regions of the computer-based model to simulate for a plurality of time steps including a first time step and a second time step, the donors having donor properties, in response to computing a flow field for the first time step of the computer-based model, extract the donor properties from extraction surfaces of the donors, and assign the donor properties to boundary surfaces of respective ones of the recipients, and generate an output flow field for the second time step based on the recipients having the assigned donor properties.

An example method disclosed herein includes identifying, prior to execution of the computer-based model, donors and recipients representative of one or more model regions of the computer-based model to simulate for a plurality of time steps including a first time step and a second time step, the donors having donor properties, in response to computing a flow field for the first time step of the computer-based model, extracting the donor properties from extraction surfaces of the donors, and assigning the donor properties to boundary surfaces of respective ones of the recipients, and generating an output flow field for the second time step based on the recipients having the assigned donor properties.

BRIEF DESCRIPTION OF THE DRAWINGS

FIGS. 6A-6B depict a first system simulation of example fluid flows associated with the example actuators of FIG. 2 in a disabled state.

FIGS. 7A-7B depict a second system simulation of example fluid flows associated with the example actuators of FIG. 2 in an enabled state.

FIGS. 8A-8C depict example views of an example simulation of one of the example actuators of FIG. 2 in the enabled state.

FIGS. 9A-9C depict an example workflow of replicating an example boundary condition from a first example actuator to a second example actuator.

FIGS. 10A-10C depict successive zoom-in views of a first partial system simulation of example fluid flows associated with a complete simulation of the example actuators of FIG. 2 in the enabled state.

FIGS. 10D-10F depict successive zoom-in views of a second partial system simulation of example fluid flows associated with a partial simulation of the example actuators of FIG. 2 in the enabled state having example boundary conditions based on the example workflow of FIGS. 9A-9C using a first example replication pattern.

FIG. 11A depicts a simulation of first example fluid flows based on a complete simulation of the example actuators of FIG. 2 in the enabled state.

FIG. 11B depicts a simulation of second example fluid flows based on a partial simulation of the example actuators of FIG. 2 based on the example workflow of FIG. 9 using the first example replication pattern.

FIG. 11C depicts a simulation of third example fluid flows based on a partial simulation of the example actuators of FIG. 2 based on the example workflow of FIG. 9 using a second example replication pattern.

FIG. 11D depicts a table of example assignments to generate the second example replication pattern.

FIG. 12A depicts other flow features from the simulation of the first example fluid flows of FIG. 11A.

FIG. 12B depicts other flow features from the simulation of the second example fluid flows of FIG. 11B based on the first replication pattern.

FIG. 12C depicts yet other flow features from the simulation of the third example fluid flows of FIG. 11C based on the second replication pattern.

FIGS. 13A-13C depict successive zoom-in views of the first partial system simulation of FIG. 10A of example fluid flows associated with a complete simulation of the example actuators of FIG. 2 in the enabled state.

FIGS. 13D-13F depict successive zoom-in views of a third partial system simulation of example fluid flows associated with a partial simulation of the example actuators of FIG. 2 in the enabled state having example boundary conditions based on the example workflow of FIGS. 9A-9C using a third example replication pattern.

DETAILED DESCRIPTION

Figure 1B:
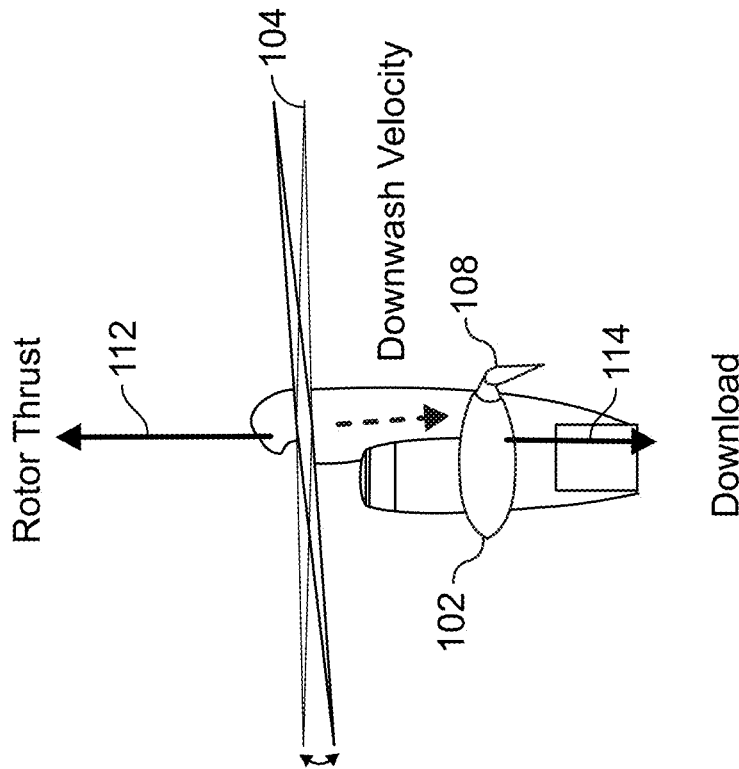
FIG. 1B is a schematic illustration of one of the example control surfaces of the example aircraft of FIG. 1A subject to a flow field created by rotor downwash.

The figures are not to scale. In general, the same reference numbers will be used throughout the drawing(s) and accompanying written description to refer to the same or like parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

Computational simulations can be used to model and/or otherwise analyze efficacy of a design (e.g., an aerodynamic design, an engineering design, etc.). In some applications, such as large scale vehicle manufacturing (e.g., aircraft vehicle manufacturing, automotive vehicle manufacturing, marine vehicle manufacturing, etc.), different designs can be simulated to identify one(s) of the designs to implement. Some applications benefit from using flow analysis tools to attempt to generate solutions to complex flow problems. Some complex flow problems include unsteady flow scenarios that involve powered systems and control devices, where alternative methods of testing can be expensive (e.g., computationally expensive, monetarily expensive, etc.) and, in some instances, impractical.

Some computational simulations are representative of a complete simulation of a flow (e.g., an air flow, a fluid flow, etc.) proximate to and/or otherwise associated with physical component(s). In a complete flow simulation, the computational domain includes all relevant physical regions of the physical component(s). Such complete flow simulations can present computational challenges within a framework of unsteady flows and relatively large powered systems, such as engines, fans, flow control actuators, tail pipe infrared suppressors, etc., due to the demand for adequate computing resources (e.g., processing resources, storage resources, etc.). For example, a flow control actuator, such as a fluidic oscillator, can have physical regions including a high-pressure supply coupling, a feedback loop, a diffuser, and an ejection jet.

For example, an aircraft control surface can include dozens of flow control actuators. In such examples, a computational domain corresponding to the aircraft control surface can include internal regions (e.g., internal physical regions) and external regions (e.g., external physical regions) of the flow control actuators to enable a complete simulation that captures interactions between the flow control actuators and surrounding flow. In some such examples, the computational domain can demand relatively large quantities of computing resources, which may not be available and, thus, can prevent execution of the simulations. In some instances, complex aircraft designs may not be implemented due to unexecuted simulation analysis based on the lack of available computing resources.

Examples disclosed herein include methods and apparatus to improve fluid flow simulations. Examples disclosed herein improve fluid flow simulations by executing computational simulation procedures for complex aerodynamic flows, where the geometry includes multiple powered devices, such as flow control actuators or power systems. In some disclosed examples, the computational simulation procedure includes computing operations associated with grid generation and boundary conditions of a computational domain. In such disclosed examples, the grid generation operations can be performed and/or otherwise executed prior to a simulation time step based on a predetermined strategy.

In some disclosed examples, a computational simulation associated with an aircraft control surface can be executed by incorporating identified boundary conditions replicated over one or more powered devices, such as flow control actuators. In such disclosed examples, the computational simulation can be executed by updating the boundary conditions during a time-integration process. Advantageously, by identifying boundary condition(s) of interest from a donor physical region and replicating the identified boundary condition(s) to one or more recipient physical regions, examples disclosed herein can effectuate a highly-efficient simulation of a computational domain to enable practical simulations for flows having disparate length and/or time scales. For example, a donor can be a sub-component of a computational domain (e.g., a computational domain donor), a simulation donor, etc.

Figure 1A:
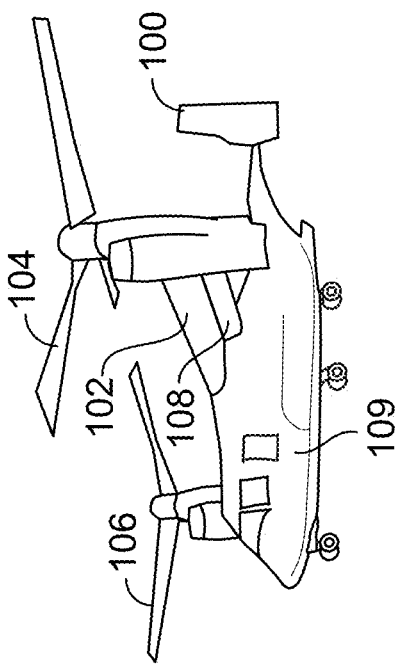
FIG. 1A is a schematic illustration of an example aircraft including an example wing and example control surfaces.

FIG. 1A is a schematic illustration of an example aircraft 100 in hover mode. The aircraft 100 of FIG. 1A includes an example wing 102 and example rotor blades 104, 106. The rotor blades 104, 106 include a first example rotor blade 104 and a second example rotor blade 106. The wing 102 includes an example flap 108, which is a control surface of the aircraft 100. The aircraft 100 has an example fuselage 109. A fore section of the flap 108 is adjacent to and/or otherwise proximate a first side of the fuselage 109.

In FIG. 1A, the aircraft 100 is a rotorcraft. Alternatively, the aircraft 100 may be a different type of aircraft, such as a passenger plane, an unmanned aerial vehicle (UAV) (e.g., a drone), etc. Alternatively, the aircraft 100 may be a land-based vehicle, such as an automobile, or a marine-based vehicle, such as a surface-level boat or a sub-surface level marine vehicle (e.g., a submarine). The rotor blades 104, 106 are rotors (e.g., tiltrotors). The wing 102 can include one or more control surfaces, such as ailerons, flaps, etc.

Figure 1C:
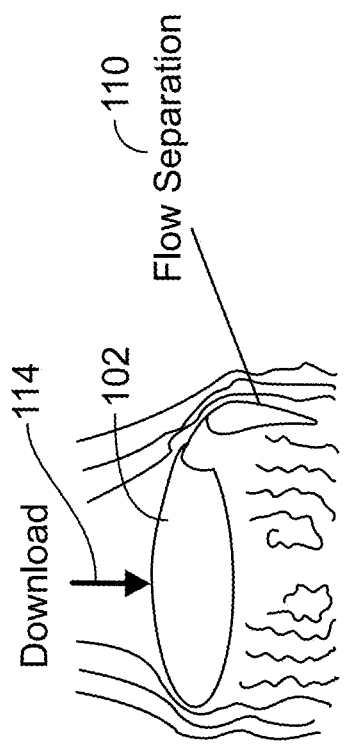
FIG. 1C is a schematic illustration of example flow separation associated with the example wing of the example aircraft of FIG. 1A.

FIG. 1B is a schematic illustration of the first rotor blade 104 of the aircraft 100 of FIG. 1A subject to a flow field created by rotor downwash having a downwash velocity. FIG. 1C is a schematic illustration of example flow separation 110 associated with the wing 102 of the aircraft 100 of FIG. 1A. In some examples, the aircraft 100 can fly in a hover flight pattern or mode. In hover, the wing 102 is in a slip stream of a corresponding one of the rotor blades 104, 106 of FIG. 1, thereby generating excessive downward force. The downward force offsets a net vertical lift generated by rotor thrust 112 of the aircraft 100 and, thus, reduces a payload capability of the aircraft 100. In some examples, flow control can be used to suppress the flow separation 110 on the flap 108 of FIGS. 1A and/or 1C. Advantageously, suppressing the flow separation 110 on the flap 108 reduces download 114 and, thus, increases a lifting capability of the aircraft 100.

Figure 2:
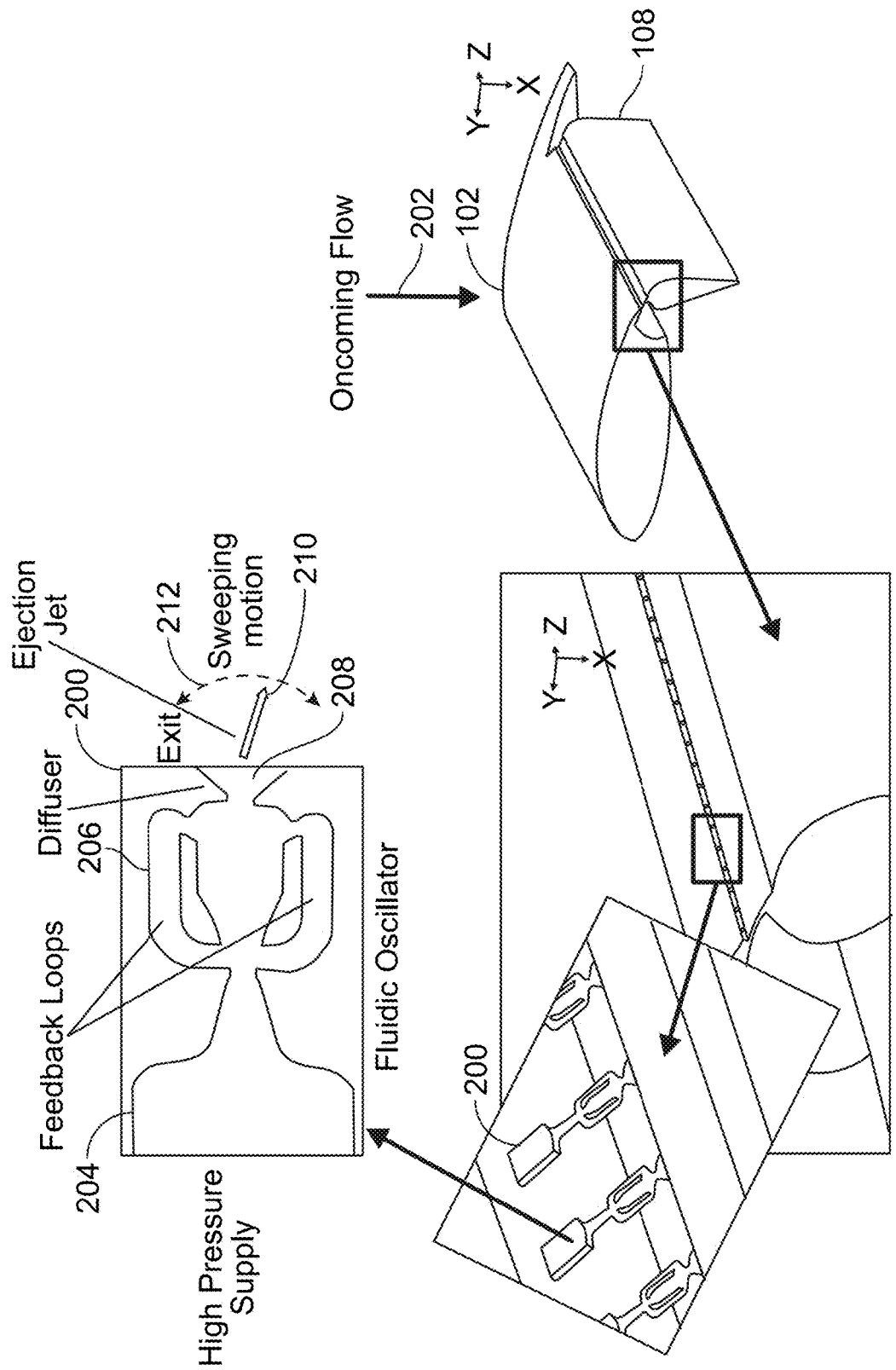
FIG. 2 depicts schematic illustrations of example actuators included in an example flight control surface of the aircraft of FIG. 1A.

FIG. 2 depicts schematic illustrations of example actuators 200 included in the flap 108 of the aircraft 100 of FIG. 1. The flap 108 includes an array or plurality of the actuators 200. The actuators 200 are fluidic oscillators, or flow actuators. In example operating conditions, the actuators 200 can expel a pressurized fluid to affect aerodynamic fluid flows proximate the flap 108. The aerodynamic fluid flows can be generated in response to oncoming flow 202 that disperses and/or otherwise moves across a surface (e.g., a top surface) of the flap 108 to cause the flow separation 110 as depicted in FIG. 1C.

In the illustrated example of FIG. 2, the actuators 200 include an example high-pressure supply 204. The high-pressure supply 204 is a repository or housing that can include a pressurized fluid (e.g., a pressurized fluid source), such as compressed air. In some examples, the high-pressure supply 204 can be coupled to a source of the pressurized fluid, such as a compressed air tank included in the aircraft 100 of FIG. 1A. For example, the actuators 200 can have respective couplings to the pressurized fluid source. The actuators 200 include example feedback loops 206 coupled to the high-pressure supply 204. For example, the feedback loops 206 can be hollow structures (e.g., tubes) that can facilitate the flow of excess pressurized fluid in a feedback or circulatory pattern. The actuators 200 include an example diffuser 208 to generate an example ejection jet 210. For example, the actuators 200 can have respective fluid communications with ambient air via respective ones of the diffuser 208. In example operating conditions, one(s) of the actuators 200 can be controlled by adjusting a position of respective one(s) of the diffusers 208 to cause a corresponding adjustment in a direction of respective one(s) of the ejection jets 210. In example operating conditions, the actuators 200 can be controlled to generate the ejection jets 210 with a sweeping motion 212.

In examples disclosed herein, a computational domain of the actuators 200, the flap 108, and/or, more generally, the wing 102 can be simulated using a computational fluid dynamics model. The actuators 200 include physical regions that can be simulated by the computational fluid dynamics model, such as a first physical region corresponding to the high-pressure supply 204, a second physical region corresponding to the feedback loops 206, a third physical region corresponding to the diffuser 208, etc. The computational fluid dynamics model can simulate interaction(s) of the oncoming flow 202 with the flap 108, the wing 102, etc. In such examples, the computational fluid dynamics model can simulate system flow fields by simulating properties associated with aerodynamic fluid flows affected by the actuators 200, the flap 108, and/or, more generally, the wing 102.

In examples disclosed herein, the computational domain associated with the actuators 200, the flap 108, and/or, more generally, the wing 102, can be simplified by identifying a donor actuator (e.g., a first one of the actuators 200), determining boundary conditions associated with the donor actuator, and replicating the boundary conditions across one or more of the remaining actuators 200 (e.g., recipient actuators). The donor actuator can be a sub-component of a computational domain (e.g., a computational domain donor, a computational domain donor actuator, etc.), a simulation donor (e.g., a simulation donor actuator), etc. Advantageously, by replacing simulations of the physical regions of the recipient actuators with the boundary conditions of the donor actuator, the computational domain decreases in size and complexity and, thus, demands fewer computing resources (e.g., processor resources, storage resources, etc.) when compared to prior computational fluid dynamics model schema.

Figure 3:
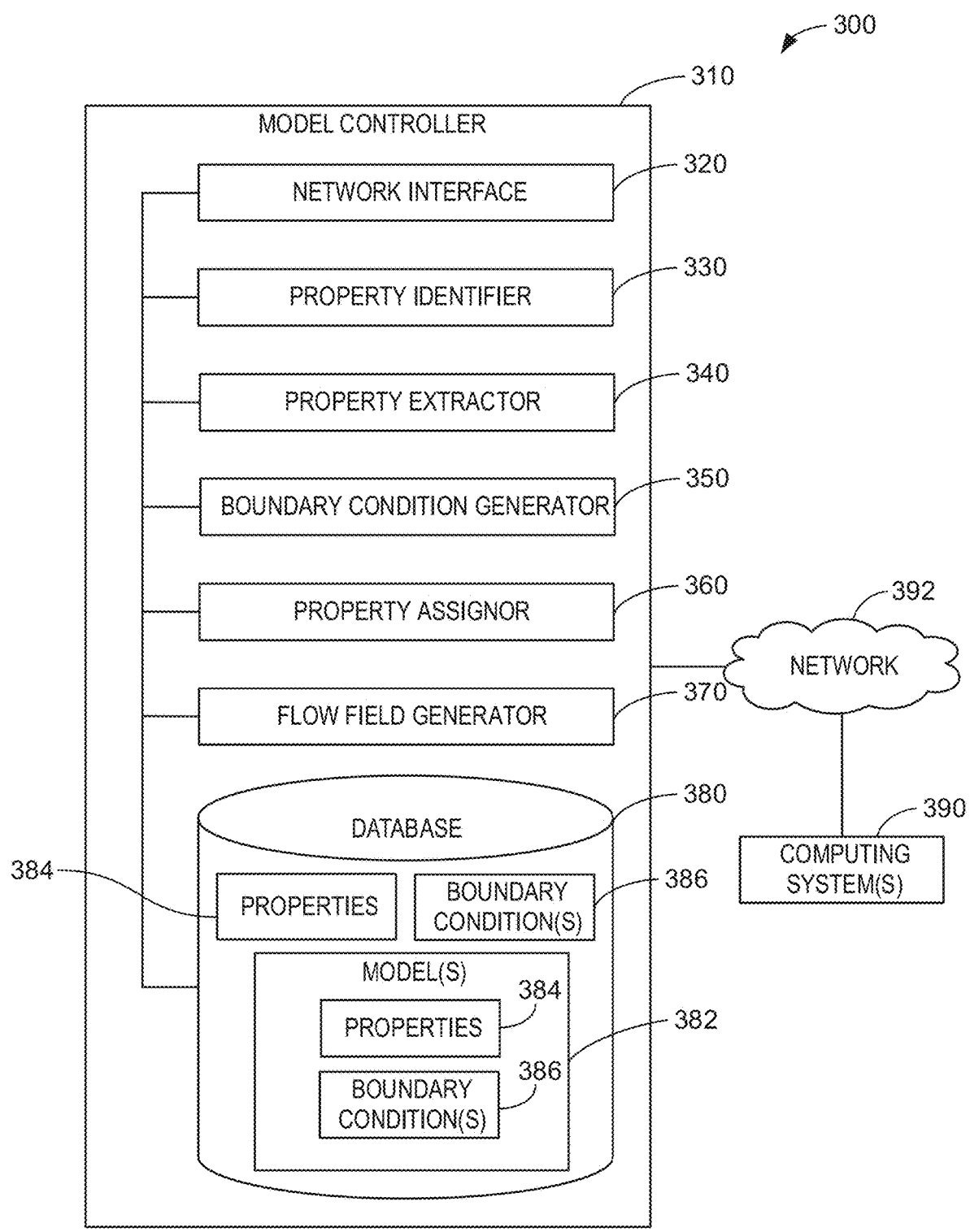
FIG. 3 is a block diagram of an example implementation of a model controller to generate an example computer-based model to simulate example properties associated with system flow fields.

FIG. 3 is a block diagram of an example computational domain simulation system 300 including an example implementation of a model controller 310 to generate example model(s) (e.g., computer-based model(s)) 382 to simulate physical regions and/or example boundary condition(s) 386 associated with system flow fields. The example model controller 310 of FIG. 3 includes an example network interface 320, an example property identifier 330, an example property extractor 340, an example boundary condition generator 350, an example property assignor 360, an example flow field generator 370, and an example database 380. The database 380 includes the model(s) 382, example properties 384, and the example boundary condition(s) 386. The model(s) 382 include the properties 384 and the boundary condition(s) 386. Further depicted in the computational domain simulation system 300 are example computing device(s) 390 communicatively coupled to the model controller 310 via an example network 392.

In the illustrated example of FIG. 3, the model controller 310 includes the network interface 320 to obtain information from and/or transmit information to the network 392. In the illustrated example, the network interface 320 implements one or more web servers that receive data from and/or transmit data to the computing system(s) 390 via the network 392. In some examples, the data can include the properties 384, the boundary condition(s) 386, the model(s) 382, etc., and/or a combination thereof. In some examples, the data can be one or more executable files (e.g., binary files, executable programs, machine readable instructions, etc.) that, when executed, by the computing system(s) 390, can implement the model(s) 382, the model controller 310, etc., and/or a combination thereof. In the illustrated example, the received data and/or the transmitted data is/are formatted as HTTP message(s). However, any other message format and/or protocol may additionally or alternatively be used such as, for example, a file transfer protocol (FTP), a simple message transfer protocol (SMTP), an HTTP secure (HTTPS) protocol, etc.

In the illustrated example of FIG. 3, the model controller 310 includes the property identifier 330 to identify donors and recipients in a computer-based model, such as the model(s) 382. In some examples, the property identifier 330 identifies a plurality of physical regions associated with a physical object to generate simulated physical regions. For example, the property identifier 330 can identify the actuators 200 of FIG. 2 as physical regions that can be simulated to generate simulated actuators. In some examples, the property identifier 330 can identify a surface of a physical region to simulate. For example, the property identifier 330 can identify a surface of a donor physical region to extract (e.g., an extraction surface, a donor extraction surface, etc.). In other examples, the property identifier 330 can identify a boundary surface of a recipient physical region. For example, the property identifier 330 can identify a surface (e.g., an exterior surface, an outermost surface, etc.) as a boundary (e.g., a physical boundary) of the diffuser 208 of FIG. 2 and, thus, identify the boundary of the diffuser 208 as a boundary surface of the diffuser 208.

In some examples, the property identifier 330 identifies a first physical region as a donor physical region and a second physical region as a recipient physical region. For example, the property identifier 330 can identify a first one of the actuators 200 as a donor actuator having donor properties and a second one of the actuators 200 as a recipient actuator having recipient properties. For example, the donor properties, the recipient properties, etc., can be ones of the properties 384. In such examples, the properties 384 can include a fluid property (e.g., density, energy, pressure (e.g., air pressure), turbulent properties, velocity (e.g., one or more components of a velocity vector, velocity vector components, etc.)). Additionally or alternatively, the properties 384 may include a physical property including at least one of an aeroelasticity, a material (e.g., a type of material), a density (e.g., a density of the material), a malleability, a structural, a tension, etc.

In the illustrated example of FIG. 3, the model controller 310 includes the property extractor 340 to extract donor properties from extraction surfaces. In some examples, the property extractor 340 selects an extraction surface of one or more donors. For example, the property extractor 340 can select a first extraction surface of a first donor, a second extraction surface of a second donor, etc. In such examples, the property extractor 340 can extract donor properties from the first extraction surface, the second extraction surface, etc. In some examples, the property extractor 340 selects a boundary surface of one or more recipients. For example, the property extractor 340 can select a first boundary surface of a first recipient, a second extraction surface of a second recipient, etc.

In some examples, the property extractor 340 extracts donor properties from an extraction surface of a model component (e.g., a model or simulation representation of a physical component), a model object (e.g., a model or simulation representation of a physical object), etc. For example, the model component can be a simulated version, a model representation, etc., of the high-pressure supply 204, the feedback loops 206, the diffuser 208, etc., and/or, more generally, the actuator 200 of FIG. 2. In such examples, the property extractor 340 can extract donor properties, such as one(s) of the properties 384 of FIG. 3.

In the illustrated example of FIG. 3, the model controller 310 includes the boundary condition generator 350 to generate a boundary condition at an extraction surface of a model component. In some examples, the extraction surface can be a simulation, a model, etc., representation of an outermost physical surface of a physical object, such as the outermost physical surface of the diffuser 208 of FIG. 2. In such examples, the boundary condition generator 350 can generate a boundary condition at the outermost physical surface of the diffuser 208 based on the properties 384. For example, the boundary condition generator 350 can generate the boundary condition based on flow properties at the outermost boundary of the diffuser 208.

In some examples, the boundary condition generator 350 determines a donor boundary condition based on donor properties at a first boundary of a donor model component. For example, in response to identifying a first one of the actuators 200 as a donor actuator, the boundary condition generator 350 can determine and/or otherwise generate a boundary condition for the first one of the actuators 200 based on one(s) of the properties 384 (e.g., flow properties, structural properties, etc.) at the first boundary.

In some examples, the boundary condition generator 350 determines a recipient boundary condition based on recipient properties at a second boundary of a recipient model component. For example, in response to identifying a second one of the actuators 200 as a recipient actuator, the boundary condition generator 350 can determine and/or otherwise generate a boundary condition for the second one of the actuators 200 based on one(s) of the properties 384 (e.g., flow properties, structural properties, etc.) at the second boundary. In such examples, the property assignor 360, as described below, can assign the donor boundary condition as the recipient boundary condition, replace the recipient boundary condition with the donor boundary condition, etc.

In the illustrated example of FIG. 3, the model controller 310 includes the property assignor 360 to assign donor properties to boundary surface(s) of recipient(s). In some examples, the property extractor 340 extracts donor properties from an extraction surface of a donor (e.g., a donor model component, a donor model object, etc.). In such examples, the property assignor 360 can assign the extracted donor properties to one or more recipients (e.g., recipient model components, recipient model objects, etc.). In some such examples, the boundary condition generator 350 can generate a boundary condition associated with the one or more recipients based on the assigned donor properties. In other examples, the property assignor 360 can assign the donor boundary condition as the recipient boundary condition.

In some examples, the property assignor 360 replaces a recipient model component and/or recipient properties associated with the recipient model component with a donor boundary condition. For example, the property identifier 330 can identify a first one of the actuators 200 as a donor actuator and a second one of the actuators 200 as a recipient actuator. In such examples, the property assignor 360 can replace one or more components of the recipient actuator, such as the high-pressure supply 204, the feedback loops 206, the diffuser 208, etc., and/or a combination thereof, with the donor boundary condition. Advantageously, by replacing the one or more components of the recipient actuator with the donor boundary condition, the property assignor 360 can improve execution of a computer-based model by simulating the donor boundary condition in place of simulating the one or more components and, thus, reduce computing resources required to execute the simulation.

In the illustrated example of FIG. 3, the model controller 310 includes the flow field generator 370 to compute, generate, and/or otherwise output a flow field for a time step (e.g., a current time step, an instant time step, etc.) of a computer-based model. In some examples, the flow field is a physics-based simulation that is representative of a distribution of one or more properties of one or more fluids over space and time. For example, the flow field generator 370 can generate a flow field, display the flow field, etc., that is representative of distribution(s) of aerodynamic properties (e.g., density, energy, pressure (e.g., air pressure), turbulent properties, velocity (e.g., one or more components of a velocity vector, velocity vector components, etc.)), etc., with respect to space (e.g., a position with a three-dimensional environment) and time (e.g., one or more discrete time steps within a defined time period). For example, the flow field generator 370 can generate a flow field representative of a grid of vectors that define a distribution of the properties 384 (e.g., density, velocity, etc.) of a fluid over space and time. In some examples, the flow field generator 370 generates an output, such as one or more flow fields, for a last computed time step based on not simulating one or more model components and associated recipient properties in response to the property assignor 360 assigning donor properties, donor boundary condition(s), etc., to corresponding recipients.

In the illustrated example of FIG. 3, the model controller 310 includes the database 380 to record data (e.g., the model(s) 382, the properties 384, the boundary condition(s) 386, physical regions, physical model regions, etc.). The database 380 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 380 may additionally or alternatively be implemented by one or more double data rate (DDR) memories, such as DDR, DDR2, DDR3, DDR4, mobile DDR (mDDR), etc. The database 380 may additionally or alternatively be implemented by one or more mass storage devices such as hard disk drive(s), compact disk drive(s), digital versatile disk drive(s), solid-state disk drive(s), etc. While in the illustrated example the database 380 is illustrated as a single database, the database 380 can be implemented by any number and/or type(s) of databases. Furthermore, the data stored in the database 380 can be in any data format such as, for example, binary data, comma delimited data, tab delimited data, structured query language (SQL) structures, etc.

In the illustrated example of FIG. 3, the model(s) 382 include the properties 384 and the boundary condition(s) 386. In the example of FIG. 3, the model(s) 382 include one or more models. In the example of FIG. 3, the boundary condition(s) 386 include one or more boundary conditions. In the example of FIG. 3, the model(s) 382 are computer-based models that, when executed, generate computational simulations representative of a simulation (e.g., a complete simulation) of a flow (e.g., an air flow, a fluid flow, etc.) proximate to and/or otherwise associated with physical component(s). In some examples, the model(s) 382 are complete flow simulations included in a computational domain, where the computational domain includes all relevant physical regions of the physical component(s).

In the illustrated example of FIG. 3, the properties 384 are representative of attribute(s), characteristic(s), and/or quality/qualities of physical component(s), physical item(s), physical object(s), etc., and/or portion(s) thereof that can be simulated in a computer-based model. In some examples, the properties 384 are flow properties, such as aerodynamic properties. For example, the properties 384 can include, correspond to, and/or otherwise be representative of density, energy, pressure, turbulent properties, velocity, etc., of a flow field. In some examples, the properties 384 are physical properties, such as material properties (e.g., a metallic property, a non-metallic property, a biological property, etc.), aeroelasticity, density, malleability, tension, etc. In some examples, the properties 384 are electrical, magnetic, and/or electromagnetic properties, such as conductivity, dielectric constant, frequency, permittivity, magnetic permittivity, velocity, wavelength, etc.

In the illustrated example of FIG. 3, the boundary condition(s) 386 are condition(s) that are to be satisfied at all or a portion of a boundary of a region, a surface, etc., in which a set of mathematical operations (e.g., differential equations) is to be solved. In some examples, the boundary condition(s) 386 is/are a set of the properties 384 at a boundary of a physical boundary of a physical object to be modeled. For example, the boundary condition(s) 386 can be a set of flow properties at a boundary of the diffuser 208, and/or, more generally, the actuator 200 of FIG. 2.

The example network 392 of the illustrated example of FIG. 3 is the Internet. However, the network 392 can be implemented using any suitable wired and/or wireless network(s) including, for example, one or more data buses, one or more Local Area Networks (LANs), one or more wireless LANs, one or more cellular networks, one or more private networks, one or more public networks, etc. The network 392 enables the model controller 310 to be in communication with the computing system(s) 390.

In the illustrated example of FIG. 3, the computing system(s) 390 are device(s) (e.g., computing device(s)), such as one or more physical servers (e.g., a rack-mounted server, a blade server, etc.), one or more virtual servers (e.g., one or more virtual machines composed of virtual hardware resources (e.g., virtual compute resources, virtual network resources, virtual storage resources, etc.), etc., and/or a combination thereof and, thus, can facilitate an interaction with the model controller 310, and/or, more generally, the computational domain simulation system 300, via the network 392. For example, the computing system(s) 390 can obtain the model(s) 382 and execute the model(s) 382. In other examples, the computing system(s) 390 can transmit the properties 384, the boundary condition(s) 386, the model(s) 382, etc., and/or a combination thereof, to the model controller 310. In such examples, the model controller 310 can improve execution of a computer-based model based on the properties 384, the boundary condition(s) 386, the model(s) 382, etc., and/or a combination thereof, from the computing system(s) 390.

Although examples described herein may relate to aircraft, as described above in connection with FIGS. 1 and/or 2, example systems, methods, apparatus, and articles of manufacture described herein are not so limited. For example, the model controller 310 of FIG. 3 and/or, more generally, the computational domain simulation system 300, can be used to improve any type of computer-based model simulation. In such examples, the model controller 310 of FIG. 3, and/or, more generally, the computational domain simulation system 300, can be used to improve the generation of flow fields associated with electromagnetics, magnetohydrodynamics, hydrodynamics, etc. For example, the model controller 310 can be executed to improve simulation of the hydrodynamics associated with multiple propellers of water-based vehicles (e.g., a boat, a ship, a submarine, etc.), the aerodynamics associated with multiple propellers of a wind turbine, multiple wind turbines of a wind farm, etc.

In some examples, the model controller 310, and/or, more generally, the computational domain simulation system 300, can be executed to model biological organism spread in aerosolized flows. For example, the model controller 310 can be used to improve the generation of flow fields associated with viral spread in aerosolized flows. In such examples, the model controller 310 can assign a donor coughing pattern associated with a first person as a recipient coughing pattern for one or more second persons. In other examples, the model controller 310 can be used to improve the generation of flow fields associated with a ventilation system having a plurality of nozzles, such as a ventilation system included in a cabin of a vehicle (e.g., a bus), an aircraft (e.g., a commercial jet, a passenger jet, etc.), etc. Advantageously, the model controller 310 can modify and/or otherwise optimize replication and/or assignment of such coughing patterns by adjusting an amplitude, a frequency, etc., based on a pre-determined pattern, a randomized pattern, a pattern based on outputs from a machine learning algorithm, etc., and/or a combination thereof.

While an example manner of implementing the example model controller 310 is illustrated in FIG. 3, one or more of the elements, processes and/or devices illustrated in FIG. 3 may be combined, divided, re-arranged, omitted, eliminated and/or implemented in any other way. Further, the example network interface 320, the example property identifier 330, the example property extractor 340, the example boundary condition generator 350, the example property assignor 360, the example flow field generator 370, the example database 380, the example model(s) 382, the example properties 384, the example boundary condition(s) 386, and/or, more generally, the example model controller 310 of FIG. 3 may be implemented by hardware, software, firmware and/or any combination of hardware, software and/or firmware. Thus, for example, any of the example network interface 320, the example property identifier 330, the example property extractor 340, the example boundary condition generator 350, the example property assignor 360, the example flow field generator 370, the example database 380, the example model(s) 382, the example properties 384, the example boundary condition(s) 386, and/or, more generally, the example model controller 310 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 320, the example property identifier 330, the example property extractor 340, the example boundary condition generator 350, the example property assignor 360, the example flow field generator 370, the example database 380, the example model(s) 382, the example properties 384, and/or the example boundary condition(s) 386 is/are hereby expressly defined to include a non-transitory computer readable storage device or storage disk such as a memory, a digital versatile disk (DVD), a compact disk (CD), a Blu-ray disk, etc. including the software and/or firmware. Further still, the example model controller 310 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIG. 4 is a schematic illustration of a first example workflow 400 to generate the model(s) 382 of FIG. 3. The first workflow 400 includes example workflow operations 402, 404, 406, 408 including a first example workflow operation 402, a second example workflow operation 404, a third example workflow operation 406, and a fourth example workflow operation 408.

In the illustrated example of FIG. 4, the first workflow operation 402 is a model importing operation. During the first workflow operation 402, the model controller 310 of FIG. 3 imports a first example computer-aided design (CAD) model (COMPUTER-AIDED DESIGN (CAD) MODEL A) 410 to improve and/or otherwise process. In some examples, the first CAD model 410 can correspond to one of the model(s) 382 of FIG. 3. For example, the network interface 320 of FIG. 3 can import and/or otherwise obtain the first CAD model 410 from the database 380 of FIG. 3, one(s) of the computing system(s) 390 of FIG. 3 from the network 392 of FIG. 3, etc.

In some examples, the first CAD model 410 is a computer-based model of the actuators 200 of FIG. 2, and/or, more generally, the wing 102 of FIGS. 1 and/or 2. The first CAD model 410 includes a first example CAD model region (CAD MODEL REGION A) 412, a second example CAD model region (CAD MODEL REGION B) 414, and a third example CAD model region (CAD MODEL REGION C) 416. The CAD model regions 410, 412, 414 are simulated portions of a computer-based model (e.g., the model(s) 382 of FIG. 3).

In some examples, the first CAD model region 412 represents a first portion (e.g., a first simulated portion) of the first CAD model 410 including a first one of the actuators 200 and/or ambient air proximate and/or otherwise near the first one of the actuators 200. In some examples, the second CAD model region 414 represents a second portion (e.g., a second simulated portion) of the first CAD model 410 including a second one of the actuators 200 and/or ambient air proximate and/or otherwise near the second one of the actuators 200. In some examples, the third CAD model region 416 represents a third portion (e.g., a third simulated portion) of the first CAD model 410 including a third one of the actuators 200 and/or ambient air proximate and/or otherwise near the third one of the actuators 200.

The first CAD model region 412 includes a first example CAD model component (CAD MODEL COMPONENT A) 418 and first example properties (PROPERTIES A) 420. The second CAD model region 414 includes a second example CAD model component (CAD MODEL COMPONENT B) 422 and second example properties (PROPERTIES B) 424. The third CAD model region 416 includes a third example CAD model component (CAD MODEL COMPONENT C) 426 and third example properties (PROPERTIES C) 428.

The first CAD model component 418, the second CAD model component 422, and/or the third CAD model component 426 can correspond to one of the components of the actuator 200 of FIG. 2, such as the high-pressure supply 204, the feedback loops 206, the diffuser 208, the ejection jet 210, etc. For example, the first CAD model component 418 can be the high-pressure supply 204, the feedback loops 206, the diffuser 208, and/or the ejection jet 210 of the first one of the actuators 200. Alternatively, the first CAD model component 418, the second CAD model component 422, and/or the third CAD model component 426 may be any other component or object included in a computer-based model.

The first properties 420, the second properties 424, and/or the third properties 428 can correspond to the properties 384 of FIG. 3. For example, the first properties 420 can be flow properties, structural properties, etc., associated with the high-pressure supply 204, the feedback loops 206, the diffuser 208, and/or the ejection jet 210 of the first one of the actuators 200. Alternatively, the first properties 420, the second properties 424, and/or the third properties 428 may be associated with any other component or object included in a computer-based model.

Figure 4:
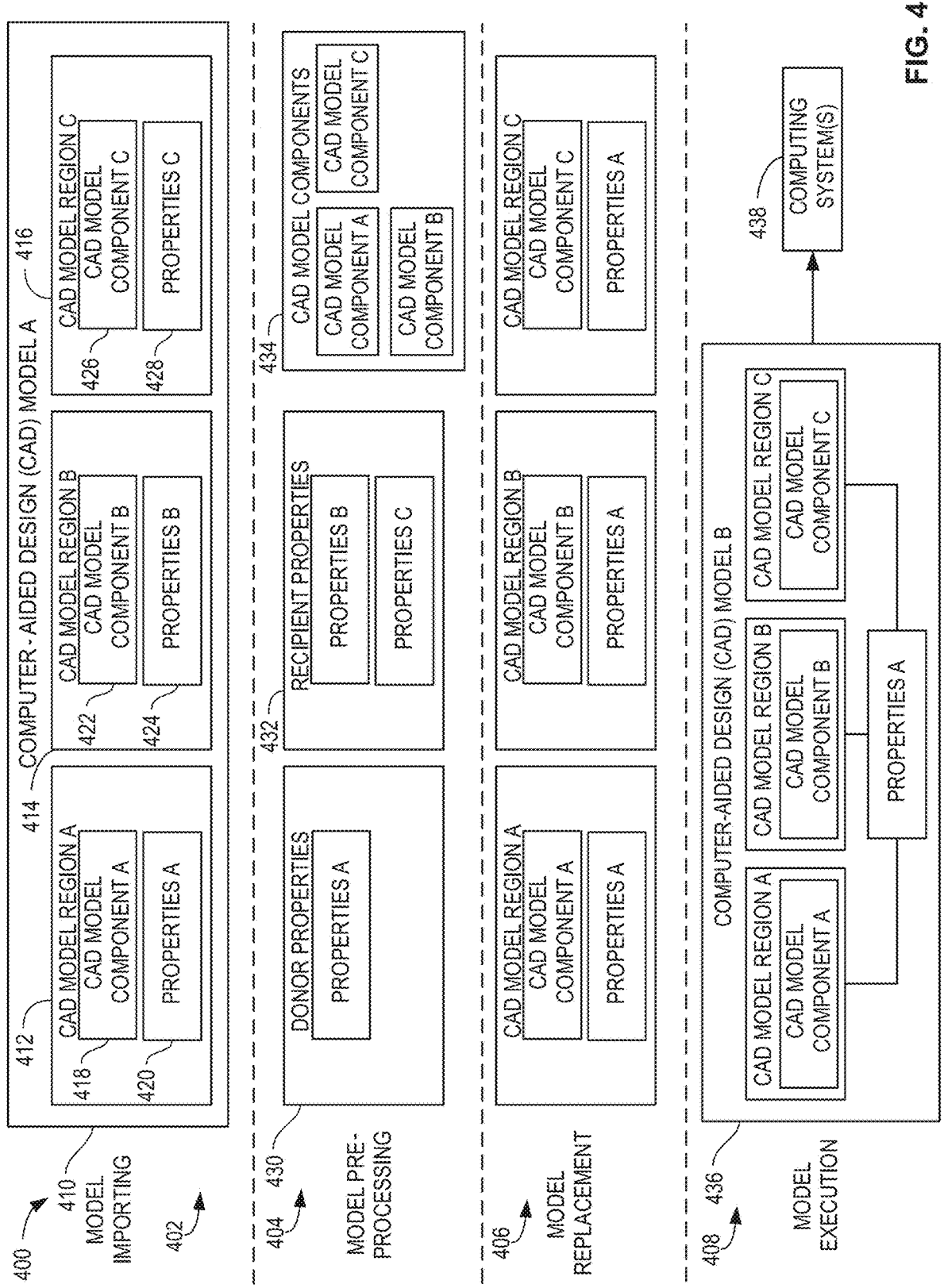
FIG. 4 is a schematic illustration of an example workflow to generate the example computer-based model of FIG. 3.

In the illustrated example of FIG. 4, the second workflow operation 404 is a model pre-processing operation. During the model pre-processing operation, the model controller 310 transforms and/or otherwise converts data from a first organization to a second organization. For example, the property identifier 330 of FIG. 3 can identify which of the first through third CAD model components 418, 422, 426 are donor(s) or recipient(s). In the example of FIG. 4, the property identifier 330 can identify the first CAD model component 418 as a donor, the second CAD model component 422 as a recipient, and the third CAD model component 426 as a recipient.

In response to identifying the CAD model components 418, 422, 426 as either a donor or recipient, the model controller 310 re-organizes the associated data during the second workflow operation 404 into temporary or intermediary example data buffers 430, 432, 434. In the example of FIG. 4, the model controller 310 generates a first example data buffer 430, a second example data buffer 432, and a third example data buffer 434. The property identifier 330, and/or, more generally, the model controller 310, generates and/or otherwise configures the first data buffer 430 as storage for donor properties and, thus, stores the first properties 420 in the first data buffer 430 as donor properties. The property identifier 330, and/or, more generally, the model controller 310, generates and/or otherwise configures the second data buffer 432 as storage for recipient properties and, thus, stores the second properties 424 and the third properties 428 in the second data buffer 432 as recipient properties. The property identifier 330, and/or, more generally, the model controller 310, generates and/or otherwise configures the third data buffer 434 as storage for CAD model components and, thus, stores the first through third CAD model components 418, 422, 426 in the third data buffer 434 as CAD model components.

In the illustrated example of FIG. 4, the third workflow operation 406 is a model replacement operation. For example, the property assignor 360 of FIG. 3, and/or, more generally, the model controller 310, can reassemble and/or otherwise recompile the CAD model regions 412, 414, 416. In the example of FIG. 4, the property assignor 360, and/or, more generally, the model controller 310, can assign the first properties 420, which are identified as donor properties, to the second CAD model component 422 and the third CAD model component 426, which are identified as recipients. Accordingly, the property assignor 360 and/or, more generally, the model controller 310, can recompile the first CAD model region 412, the second CAD model region 414, and the third CAD model region 416 to include the first properties 420.

In the illustrated example of FIG. 4, the fourth workflow operation 408 is a model execution operation. For example, the property assignor 360, the flow field generator 370, and/or, more generally, the model controller 310, can compile the reassembled CAD model regions 412, 414, 416 as depicted in the third workflow operation 406 into a second example CAD model (COMPUTER-AIDED DESIGN (CAD) MODEL B) 436. In such examples, the first properties 420 can be shared and/or otherwise assigned to each of the CAD model components 418, 422, 426.

During the fourth workflow operation, the second CAD model 436 is delivered, provided, and/or otherwise transmitted to example computing system(s) 438 for execution. For example, the flow field generator 370 of FIG. 3, and/or, more generally, the model controller 310 can execute the second CAD model 436 to output and/or otherwise generate flow fields for one or more time steps of interest.

In some examples, the computing system(s) 438 are one or more computing devices that can execute the model controller 310 of FIG. 3. In some examples, the computing system(s) 438 correspond to the computing system(s) 390 of FIG. 3. For example, the model controller 310 can transmit the second CAD model 436 via the network 392 to the computing system(s) 390 of FIG. 3 for execution by the computing system(s) 390.

Figure 5:
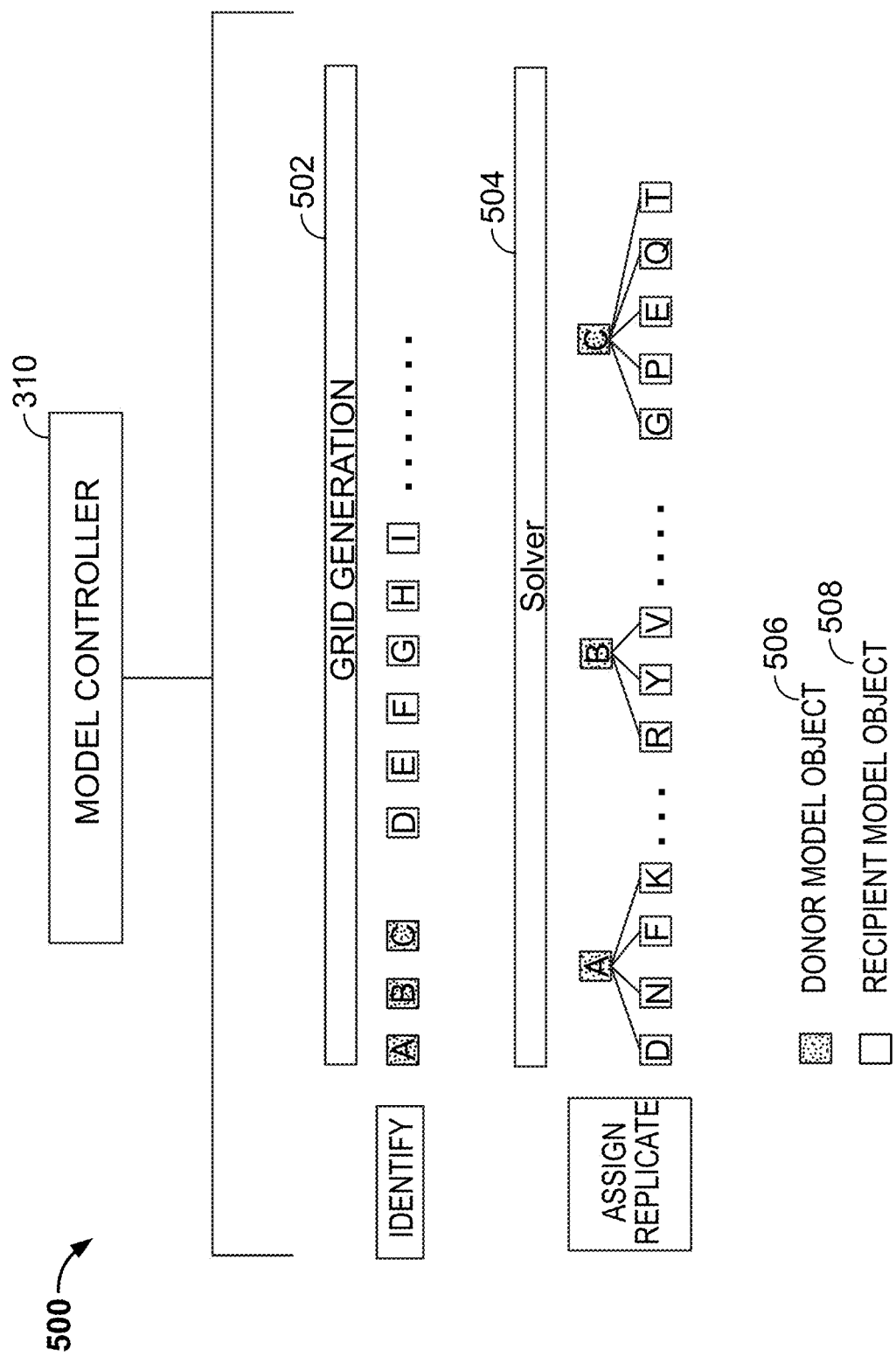
FIG. 5 is a schematic illustration of another example workflow to generate the example computer-based model of FIG. 3.

FIG. 5 is a schematic illustration of a second example workflow 500 to generate the model(s) 382 of FIG. 3. The second workflow 500 can be executed by the model controller 310 of FIG. 3. The second workflow 500 includes a first example workflow operation 502 and a second example workflow operation 504. In the example of FIG. 5, the first workflow operation 502 is a grid generation operation. In the example of FIG. 5, the second workflow operation 504 is a solver operation.

In the illustrated example of FIG. 5, the model controller 310 generates grid(s) for the model(s) 382 during the first workflow operation 502. In some examples, the model controller 310 computes a numerical solution to equations (e.g., differential equations) that describe and/or otherwise characterize a physical process to generate flow field(s). In such examples, the model controller 310 can construct and/or otherwise generate a grid to facilitate the computation of the numerical solution. For example, the model controller 310 can cover a physical domain, such as the wing 102 of FIGS. 1 and/or 2 or any other physical object or environment, with a grid, or mesh, so that discrete volumes or elements of the physical domain can be identified where conservation laws can be applied. In such examples, the model controller 310 discretizes the physical domain of the model(s) 382 and generates the grid or mesh as geometrical shapes that are formed to cover the discretized physical domain.

During the first workflow operation 502, the model controller 310 identifies one(s) of model objects as either example donor model object(s) 506 or example recipient model object(s) 508. For example, the model objects can be one(s) of the properties 384 of FIG. 3, one(s) of the boundary condition(s) 386 of FIG. 3, etc. In the example of FIG. 5, the property identifier 330 of FIG. 3, and/or, more generally, the model controller 310, identifies model objects A, B, and C as the donor model objects 506 and identifies model objects D, E, F, G, H, I, etc., as the recipient model objects 508. In some examples, the property identifier 330 of FIG. 3, and/or, more generally, the model controller 310, identifies one(s) of the model objects as either one of the donor model objects 506 or one of the recipient model objects 508 based on a pre-determined pattern, a random pattern, a pseudo-random pattern, etc.

During the second workflow operation 504, the model controller 310 assigns one of the donor model objects 506 to ones of the recipient model objects 508. For example, the property assignor 360 of FIG. 3, and/or, more generally, the model controller 310, can assign donor model object A to recipient model objects D, F, N, K, etc., donor model object B to recipient model objects R, Y, V, etc., and donor model object C to recipient model objects E, G, P, Q, T, etc. In such examples, the property assignor 360 can replace recipient model objects D, F, N, K, etc., with the boundary condition of donor model object A. Advantageously, the model(s) 382 that include(s) the model objects A, B, C, D, etc., of FIG. 5, can be executed with fewer computing resources because the boundary condition of donor model object A is executed multiple times in place of simulating an entirety of recipient model objects D, F, N, K, etc.

FIGS. 6A-6B depict a first example system simulation 600 of example fluid flows associated with the actuators 200 of FIG. 2 in a disabled state. For example, the first system simulation 600 of FIGS. 6A-6B corresponds to a baseline example. In such examples, the actuators 200 of FIG. 2 can be disabled and/or otherwise turned off to not expel pressurized fluid and/or otherwise not generate the ejection jets 210 of FIG. 2, which causes separated flow to occur that originates in the fore section of the flap 108. The fore section of the flap 108 depicted in the illustrated example of FIGS. 6A-6B is adjacent a side of the fuselage 109 of the aircraft 100 of FIG. 1A. The flow separation results in a relatively sizeable wing wake and significant drag (e.g., a download force). FIG. 6A depicts a perspective view of the wing 102 of FIG. 1. FIG. 6A illustrates contours of varying degrees of pressure coefficient (Cp) (e.g., pressure coefficient contours).

FIG. 6B depicts a portion of the first system simulation 600 of FIG. 6A. FIG. 6B depicts a cut through view of the wing 102 of FIG. 1 to illustrate the actuators 200 in the disabled state. FIG. 6B illustrates contours of varying degrees of Mach number (M) (e.g., Mach contours, Mach number contours, etc.).

FIGS. 7A-7B depict a second example system simulation 700 of example fluid flows associated with the actuators 200 of FIG. 2 in an enabled state. For example, the second system simulation 700 of FIGS. 7A-7B corresponds to an actuated example. In such examples, the actuators 200 of FIG. 2 can be actuated and/or otherwise turned on to expel pressurized fluid and/or otherwise generate the ejection jets 210 of FIG. 2, which causes the flow to attach (e.g., the separated flow of FIGS. 6A-6B is reduced). FIG. 7A depicts a perspective view of the wing 102 of FIG. 1. FIG. 7A illustrates contours of varying degrees of pressure coefficient (Cp) (e.g., pressure coefficient contours).

FIG. 7B depicts a portion of the second system simulation 700 of FIG. 7B. FIG. 7B depicts a cut through view of the wing 102 of FIG. 1 to illustrate the actuators 200 in the enabled state. FIG. 7B illustrates contours of varying degrees of Mach number (M) (e.g., Mach contours, Mach number contours, etc.).

In the flow-controlled example of FIGS. 7A-7B, the same stagnation pressure and temperature are prescribed at the inlet of each of the actuators 200, which results in an array of supersonic jets sweeping in the area downstream of the actuators 200. The cuts through the actuators depicted in FIG. 7B illustrate the instantaneous Mach number contours, indicating elevated velocities due to actuation, compared to the stagnant flow in the baseline case depicted in the examples of FIGS. 6A-6B. Collectively, the actuation creates a curtain of high speed jets that energize the viscous layer and prevents and/or otherwise reduces flow separation over the entirety of the flap 108. The attached flow, as depicted in FIG. 7A, can lead to a reduction in the width of the wake, commensurate with a significant reduction in download.

Advantageously, examples disclosed herein can improve execution of the first system simulation 600 of FIGS. 6A-6B and the second system simulation 700 of FIGS. 7A-7B by reducing the computational time required to model the inner regions of the actuators 200. Advantageously, examples disclosed herein can replicate the flows from selected ones of the actuators 200 (e.g., donor actuators) to non-selected ones of the actuators 200 (e.g., recipient actuators). For example, the model controller 310 of FIG. 3 can identify the donor actuators to be fully discretized and identify the recipient actuators to be represented by a relatively smaller portion of the recipient actuators and an accompanying boundary condition that is replicated from the boundary condition of a corresponding one of the donor actuators.

FIGS. 8A-8C depict various example views 800, 810, 820 of an example simulation one of the actuators 200 of FIG.

2 in the enabled state. FIG. 8A depicts a first example view 800 of the simulation of the actuator 200, where a surface of the flap 108 of FIG. 1 is not removed. The first view 800 depicts a simulation of the actuator 200 generating the ejection jet 210 from the diffuser 208 of FIG. 2. For example, the first view 800 depicts a simulation of a jet (e.g., the ejection jet 210) emanating from an actuator (e.g., the actuator 200).

FIG. 8B depicts a second example view 810 of the simulation of the actuator 200 of FIG. 2, where a surface of the flap 108 of FIG. 1 is transparent to depict an inner flow of the actuator 200. The second view 810 can correspond to the simulation depicted in the first view 800 of FIG. 8A. Accordingly, the second view 810 is a different view of the same simulation depicted in the first view 800 of FIG. 8A.

The second view 810 includes a first example model component 802, a second example model component 804, a third example model component 806, and a fourth example model component 808. The first model component 802 can correspond to a simulation or representation of the high-pressure supply 204 of FIG. 2 in a computer-based model. The second model component 804 can correspond to a simulation or representation of the feedback loops 206 of FIG. 2 in the computer-based model. The third model component 806 can correspond to a simulation or representation of the diffuser 208 of FIG. 2 in the computer-based model. The fourth model component 808 can correspond to a simulation or representation of the ejection jets 210 of FIG. 2 in the computer-based model. For example, the second view 810 can simulate the actuator 200 generating the ejection jet 210 from the diffuser 208 of FIG. 2. In some examples, the first model component 802, the second model component 804, the third model component 806, and/or the fourth model component 808 correspond to at least one of the first CAD model component 418, the second CAD model component 422, or the third CAD model component 426 of FIG. 4.

FIG. 8C depicts a third example view 820 of the simulation of the actuator 200 of FIG. 2, where a surface of the flap 108 of FIG. 1 is removed to depict an actuator grid system including the high-pressure supply 204, the feedback loops 206, the diffuser 208, and air (e.g., ambient air, ambient airflow, etc.) 822 proximate and/or otherwise near an outer boundary of the actuator 200. The actuator grid system of FIG. 8C can be used by the simulation depicted in the first view 800 of FIG. 8A and/or the second view 810 of FIG. 8B. Further depicted in FIG. 8C is a zoomed-in view 824 depicting a close-up view of the feedback loops 206, the diffuser 208, and the ambient air 822 proximate the diffuser 208.

In FIG. 8C, the actuator 200 has example surfaces (e.g., extraction surfaces, boundary surfaces, etc.) 826, 828, 830 including a first example surface 826, a second example surface 828, and a third example surface 830. In some examples, in response to the model controller 310 identifying the actuator 200 as a donor actuator, the model controller 310 identifies the surfaces 826, 828, 830 as extraction surfaces. For example, the model controller 310 of FIG. 3 can extract the properties 384 from the first surface 826, the second surface 828, and/or the third surface 830.

In some examples, the model controller 310 generates and/or otherwise determines the boundary condition(s) 386 based on the extracted ones of the properties 384. For example, the model controller 310 can determine a first one of the boundary conditions 386 at the first surface 826 (e.g., the first extraction surface) based on first one(s) of the properties 384 extracted and/or otherwise determined at the first surface 826. In other examples, the model controller 310 can determine a second one of the boundary conditions 386 at the second surface 828 (e.g., the second extraction surface) based on second one(s) of the properties 384 extracted and/or otherwise determined at the second surface 828. In yet other examples, the model controller 310 can determine a third one of the boundary conditions 386 at the third surface 830 (e.g., the third extraction surface) based on third one(s) of the properties 384 extracted and/or otherwise determined at the third surface 830.

In some examples, in response to the model controller 310 identifying the actuator 200 as a recipient or replicated actuator, the model controller 310 identifies the surfaces 826, 828, 830 as boundary surfaces. For example, the model controller 310 of FIG. 3 can assign the properties 384 from a first extraction surface of a donor actuator as one or more boundary conditions at the first surface 826, the second surface 828, and/or the third surface 830. In such examples, the model controller 310 can extract donor properties from the first extraction surface of the donor actuator and assign the donor properties to the boundary surfaces (e.g., the first surface 826, the second surface 828, or the third surface 830) of the actuator 200 when identified as the recipient or replicated actuator.

The flow (e.g., the air flow, the fluid flow, etc.) over the flap 108 as depicted in FIGS. 8A-8C is influenced by the ejection jets 210 emanating from the diffusers 208 of each of the actuators 200. In some examples, the flow over the flap as influenced by the ejection jets 210 is a salient feature to be preserved. In such examples, a grid surface (e.g., a control grid surface) within the diffuser 208 is selected for replication, assignment, etc., from a donor to a recipient. In the examples of FIGS. 8A-8C, the control grid surface is a mid-diffuser section (e.g., a portion, a mid-portion, etc., of the diffuser 208 between a left-most side or surface of the diffuser 208 and a right-most side or surface of the diffuser 208).

FIGS. 9A-9C depict an example workflow 900 of replicating an example boundary condition 910 from an example donor (e.g., a donor actuator) 912 to an example recipient (e.g., a recipient actuator, a replicated actuator, etc.) 914. The boundary condition 910 can correspond to and/or otherwise be an example implementation of the boundary condition(s) 386 of FIG. 3. The donor 912 and the recipient 914 are example simulations or representations of the actuator 200 in an example computer-based model 916. The computer-based model 916 can be an example implementation of the model(s) 382 of FIG. 3. The workflow 900 of FIGS. 9A-9C includes a first example workflow operation 902, a second example workflow operation 904, and a third example workflow operation 906.

FIG. 9A depicts the first workflow operation 902. During the first workflow operation 902, the property identifier 330, and/or, more generally, the model controller 310 of FIG. 3, can identify the properties 384 of FIG. 3 used to characterize and/or otherwise represent an actuation intensity (e.g., a jet momentum of the ejection jet 210, power coefficient(s) of the ejection jet 210, etc.) of the actuator 200. The actuation intensity parameters, such as the jet momentum, the power coefficient(s), etc., are customarily defined at the nozzle throat. The property identifier 330 can identify the properties 384 at an example extraction surface 918 of the donor 912. In FIG. 9A, the extraction surface 918 is a boundary (e.g., an outermost surface) of the donor 912. The property extractor 340, and/or, more generally, the model controller 310, can extract the properties 384 from the extraction surface 918. The boundary condition generator 350, and/or, more generally, the model controller 310, can generate the boundary condition 910 based on the properties 384 extracted from the extraction surface 918.

Advantageously, the model controller 310 can replicate the properties 384 that characterize the actuation intensity from the donor 912 to one or more recipients, such as the recipient 914 of FIG. 9C, so that the values of the replicated ones of the properties 384 are essentially the same as those of the donor 912. For example, the boundary condition 910 depicted in FIG. 9A can be based on the properties 384 that characterize the actuation intensity.

FIG. 9B depicts the second workflow operation 904. During the second workflow operation 904, the property extractor 340 of FIG. 3, and/or, more generally, the model controller 310, can extract the properties 384 of FIG. 3 from the actuator grid system (e.g., the control grid surface of the fully modeled one of the actuator 200).

FIG. 9C depicts the third workflow operation 906. During the third workflow operation 906, the property assignor 360 of FIG. 3, and/or, more generally, the model controller 310, can use the extracted ones of the properties 384 (e.g., donor properties) to mimic and/or otherwise replicate the actuation of the properties 384 of the replicated actuators (e.g., the recipients) as an inflow boundary condition, depicted as the boundary condition 910. In FIG. 9C, the property assignor 360 can replicate the boundary condition 910 from the donor 912 to an example boundary surface 920 of the recipient 914. In FIG. 9C, the boundary surface 920 is a boundary (e.g., an outermost surface) of the recipient 914. In some examples, the donor 912 and the recipient 914 can be neighboring actuators, where the donor 912 and the recipient 914 are immediately adjacent to each other. In other examples, the donor 912 and the recipient 914 are neighboring actuators but are not immediately adjacent to each other. For example, the boundary surface 920 can be an outermost layer, surface, boundary, etc., of the diffuser 208 of the recipient 914. Advantageously, by replicating the actuation of the recipients, such as the recipient 914, with the actuation of the donor(s), such as the donor 912, the model controller 310 can ensure that the interplay, interaction, etc., between the sweeping motion 212 of the ejection jets 210 and the surrounding flow (e.g., the ambient air 822) in the vicinity of the exit plane is fully captured.

FIGS. 10A-10C depict a first partial system simulation 1000 of example fluid flows associated with a complete simulation of the actuators 200 of FIG. 2 in the enabled state. For example, the model controller 310 can characterize and/or otherwise quantify the fluid flows in FIGS. 10A-10C with varying instantaneous Mach numbers (M). FIGS. 10A-10C depict partial system simulations because a portion of a computational domain of a system (e.g., the aircraft 100 of FIG. 1A) is depicted. FIGS. 10A-10C depict a complete simulation because each of the actuators 200 is fully discretized and, thus, completely simulated. For example, the model controller 310 can discretize and simulate the high-pressure supply 204, the feedback loops 206, the diffuser 208, and the ejection jets 210 of each of the actuators 200 in the complete simulation.

FIG. 10A depicts 32 of the actuators 200, with a left-most one of the actuators 200 (i.e., actuator 1) located at the root of the wing 102 and a right-most one of the actuators located at the tip of the wing 102 (i.e., actuator 32) with actuators 2-31 arranged and/or otherwise disposed in between. Further depicted in FIG. 10A is a first portion view 1002, which is depicted in greater detail in FIG. 10B.

FIG. 10B depicts the first portion view 1002 in greater detail. In FIG. 10B, a portion of the actuators 200 of FIG. 10A are depicted. In FIG. 10B, the portion of the actuators 200 includes a first set of the actuators 200 including nine actuators (labeled from 1-9) and a second set of the actuators 200 including nine actuators (labeled from 10-18). Further depicted in FIG. 10B is a second portion view 1004, which is depicted in greater detail in FIG. 10C.

FIG. 10C depicts the second portion view 1004 of FIG. 10B in greater detail. In FIG. 10C, a portion of the actuators 200 of FIG. 10B is depicted. In FIG. 10B, the portion of the actuators 200 includes actuators 8, 9, 10, 11, and 12 of the actuators 200. As depicted in the examples of FIGS. 10A-10C, the instantaneous Mach numbers indicate a relatively random response as the ejection jets are illustrated at various phases of their respective oscillating cycle.

FIGS. 10D-10F depict a second partial system simulation 1010 of example fluid flows associated with a partial simulation of the actuators 200 of FIG. 2 in the enabled state. For example, the model controller 310 can characterize and/or otherwise represent the fluid flows in FIGS. 10D-10F with varying instantaneous Mach numbers (M). FIGS. 10D-10F depict partial system simulations because a portion of a computational domain of a system (e.g., the aircraft 100 of FIG. 1A) is depicted.

FIGS. 10D-10F depict a partial simulation of the actuators 200 because actuators 1, 9, 17, and 25 are fully discretized and, thus, are completely simulated. For example, model controller 310 can discretize and simulate the high-pressure supply 204, the feedback loops 206, a portion (e.g., an upstream portion, an upstream segment, etc.) of the diffuser 208, and the ejection jets 210 of each of actuators 1, 9, 17, and 25. The model controller 310 can partially discretize and, thus, not completely simulate the remaining ones of the actuators (e.g., actuators 2-8, 10-16, 18-24, and 26-32). For example, the high-pressure supply 204, the feedback loops 206, and the upstream portion of the diffuser 208 of actuators 2-8, 10-16, 18-24, and 26-32 are not simulated by the model controller 310. In such examples, the model controller 310 can replace the high-pressure supply 204, the feedback loops 206, and the upstream portion of the diffuser 208 of actuators 2-8, 10-16, 18-24, and 26-32 with example boundary conditions that are generated and/or otherwise assigned based on the workflow 900 of FIGS. 9A-9C using a first example replication pattern 1011.

In FIG. 10D, the first replication pattern 1011 is representative of the model controller 310 splitting the array of the actuators 200 into four example groups 1012, 1014, 1016, 1018 of 8 of the actuators 200 each. The groups 1012, 1014, 1016, 1018 include a first example group 1012 including actuators 1-8, a second example group 1014 including actuators 9-16, a third example group 1016 including actuators 17-24, and a fourth example group 1018 including actuators 25-32. In each of the groups 1012, 1014, 1016, 1018, the first actuator is fully discretized, modeled, simulated, etc., while the rest of the actuators in the groups 1012, 1014, 1016, 1018 are replicated. For example, actuator 1 in the first group 1012 is fully modeled, and the model controller 310 can use the instantaneous flow properties in the diffuser 208 of actuator 1 as inflow boundary conditions 1019 for each of the actuators 2-8 at their respective diffuser (e.g., diffuser station) 208. The boundary conditions 1019 can correspond to and/or otherwise be an example implementation of the boundary condition(s) 386 of FIG. 3.

FIG. 10E depicts a zoomed-in view of FIG. 10D. In FIG. 10E, a portion of the actuators 200 of FIG. 10D are depicted. In FIG. 10E, the portion of the actuators 200 includes actuators 1-18. Further depicted in FIG. 10E is a portion view 1020, which is depicted in greater detail in FIG. 10F.

FIG. 10F depicts the portion view 1020 of FIG. 10E in greater detail. In FIG. 10F, a portion of the actuators 200 of FIG. 10E is depicted. In FIG. 10F, the portion of the actuators 200 includes actuators 8, 9, 10, 11, and 12 of the actuators 200. In FIG. 10F, the high-pressure supply 204, the feedback loops 206, and the diffuser 208 of actuator 8 have been replaced with the boundary conditions 1019 of actuator 1. In FIG. 10F, the model controller 310 replicates example boundary conditions 1021 at the boundary surface of the diffuser 208 of actuator 9 at actuators 10, 11, and 12. The boundary conditions 1021 can correspond to and/or otherwise be an example implementation of the boundary condition(s) 386 of FIG. 3.

Advantageously, the model controller 310 can simulate and/or otherwise generate the ejection jets 210 of actuators 10, 11, 12, etc., using the boundary conditions 1021 of actuator 9 instead of the model controller 310 discretizing the entirety of actuators 10, 11, 12, etc. For example, the jet plume of the ejection jets 210 of actuators 10, 11, 12 are similar (e.g., substantially similar based on a tolerance in a range of 0.1-1.0% or any other range) to the jet plume of the ejection jet 210 of actuator 9.

Figure 10G:
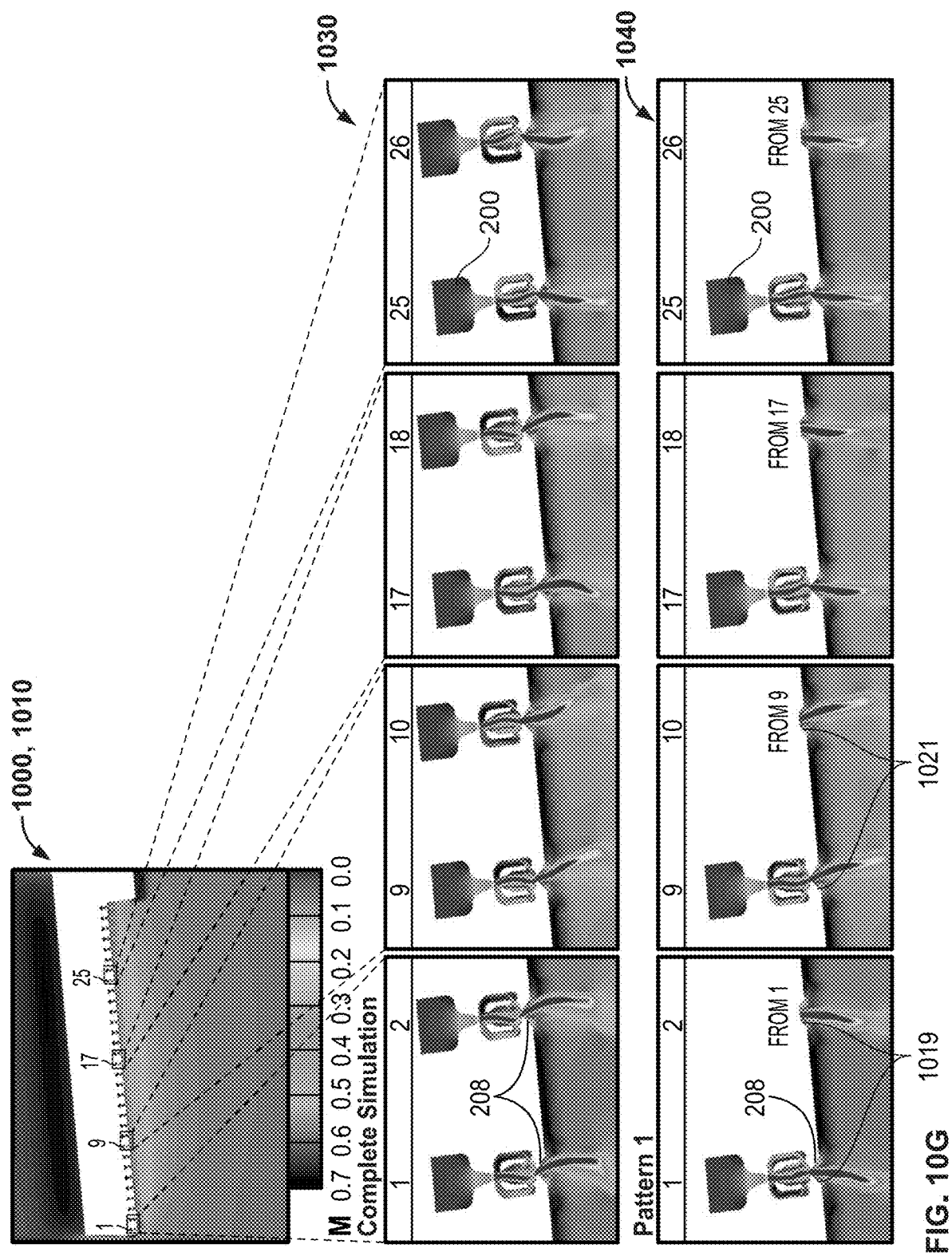
FIG. 10G depicts cutaway portions of the first partial system simulation of FIG. 10A and the second partial system simulation of FIG. 10D.

FIG. 10G depicts cutaway portions 1030, 1040 of the first partial system simulation 1000 of FIG. 10A and the second partial system simulation 1010 of FIG. 10D. The cutaway portions 1030, 1040 include first example cutaway portions 1030 and second example cutaway portions 1040. The first cutaway portions 1030 depict simulations of actuators 1, 2, 9, 10, 17, 18, 25, and 26 of the actuators 200 of FIG. 2. For example, actuators 1, 2, 9, 10, 17, 18, 25, and 26 in the first cutaway portions 1030 are entirely simulated. The second cutaway portions 1040 depict complete simulations of actuators 1, 9, 17, and 25 and partial simulations of actuators 2, 10, 18, and 26. For example, the model controller 310 can simulate actuator 2 based on replicating the boundary conditions 1019 of actuator 1 at the boundary surface of the diffuser 208 of actuator 2 and, thus, the model controller 310 can replace the diffuser 208 of actuator 2 with the boundary conditions 1019. In such examples, the model controller 310 simulates actuator 10 based on replicating the boundary conditions 1021 of actuator 9 at the boundary surface of the diffuser 208 of actuator 10 and, thus, the model controller 310 can replace the diffuser 208 of actuator 10 with the boundary conditions 1021.

The cutaway portions 1030, 1040 of FIG. 10G depict the comparison between the complete simulated flow depicted in the first cutaway portions 1030 to the pattern 1 simulated flow depicted in the second cutaway portions 1040. Advantageously, the jet plumes of each of the donor-replicated pairs (e.g., actuators 1 and 2, actuators 9 and 10, etc.) are similar (e.g., substantially similar based on a tolerance in a range of 0.1-1.0% or any other range) to each other. For example, while the actuation stroke varies at actuators 1, 9, 17, and 25, the corresponding adjacent actuators are accordingly replicated by the model controller 310.

Figure 10H:
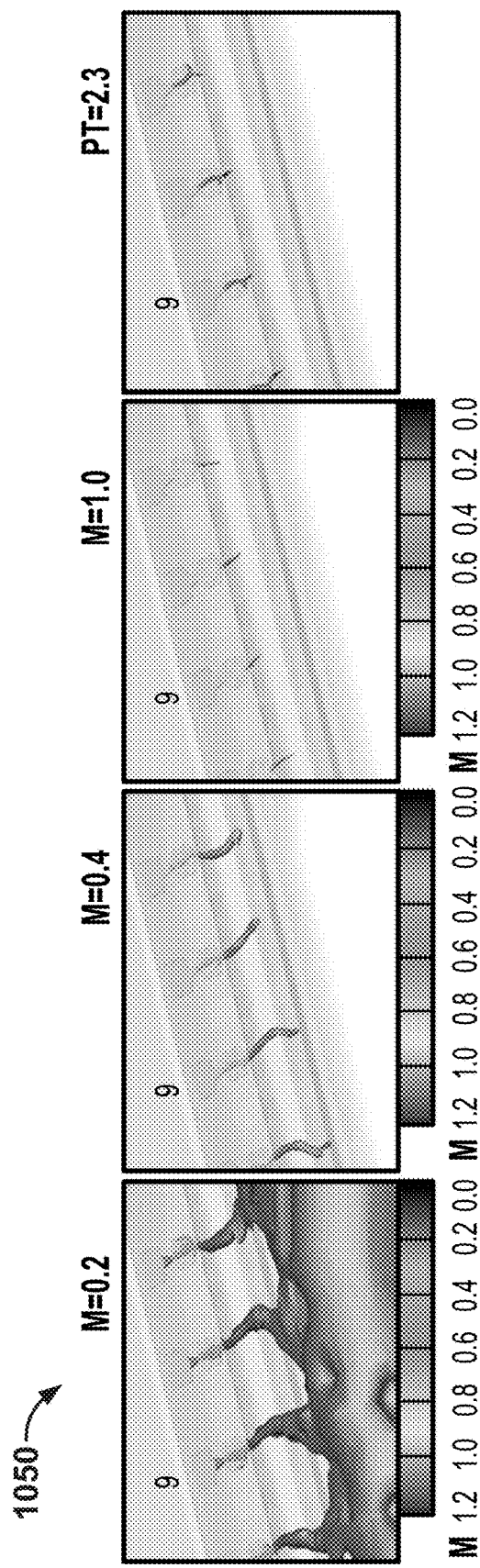
FIG. 10H depicts a portion of the first partial system simulation of FIG. 10A.

FIG. 10H depicts an example portion 1050 of the first partial system simulation 1000 of FIG. 10A. The portion 1050 includes perspective views of iso-surfaces of Mach numbers (M) and total pressure (PT). The portion 1050 depicted in FIG. 10H depicts the fluid flow in the vicinity, the proximity, etc., of actuators 8-11 at various Mach numbers (e.g., M=0.2, M=0.4, M=1.0, etc.) or total pressure (e.g., PT=2.3) in response to the model controller 310 completely discretizing and/or otherwise simulating actuators 8-11.

Figure 10I:
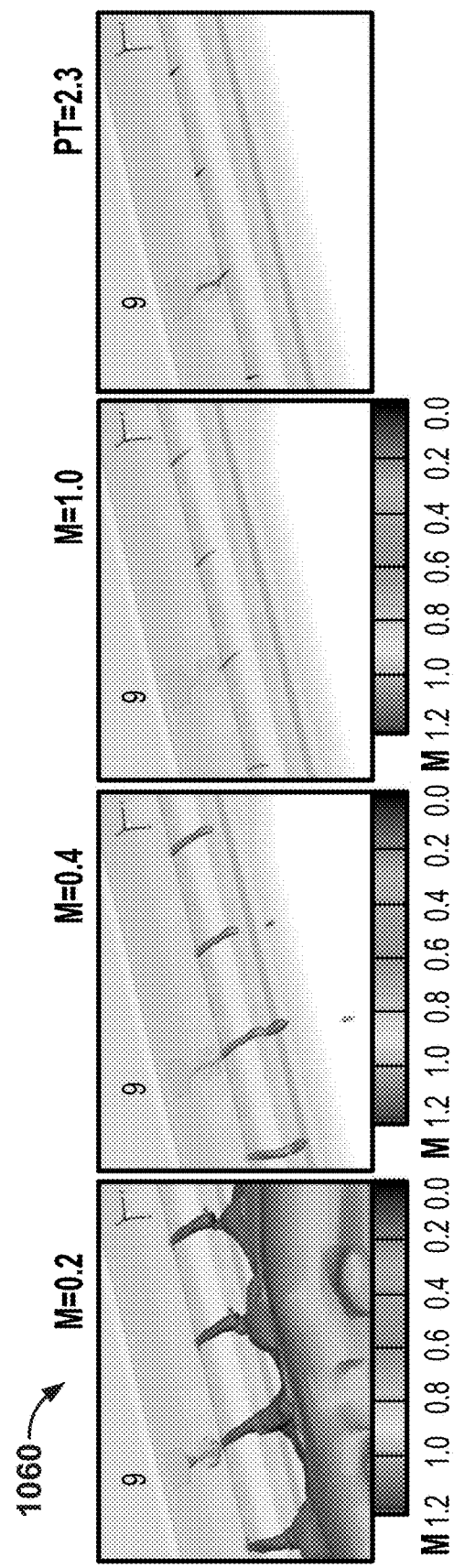
FIG. 10I depicts a portion of the second partial system simulation of FIG. 10D based on the first replication pattern.

FIG. 10I depicts an example portion 1060 of the second partial system simulation 1010 of FIG. 10D. The portion 1060 includes perspective views of iso-surfaces of Mach numbers and total pressure. The portion 1060 depicted in FIG. 10I depicts the fluid flow in the vicinity, the proximity, etc., of actuators 8-11 at various Mach numbers (e.g., M=0.2, M=0.4, M=1.0, etc.) or total pressure (e.g., PT=2.3) in response to the model controller 310 replicating the boundary conditions 1019 of actuator 9 to the boundary surface of actuator 10 based on the first replication pattern 1011 of FIGS. 10D-10F.

FIG. 11A depicts a first example simulation 1100 of first example fluid flows based on a complete simulation of the actuators 200 of FIG. 2 in the enabled state. For example, the first simulation 1100 of FIG. 11A can be a portion of the first partial system simulation 1000 of FIG. 10A. FIG. 11A depicts full simulations of actuators 1, 2, 9, 10, 17, 18, 25, and 26 of the actuators 200 of FIG. 2. For example, the model controller 310 can entirely simulate actuators 1, 2, 9, 10, 17, 18, 25, and 26 in the first simulation 1100.

FIG. 11B depicts a second example simulation 1110 of second example fluid flows based on a partial simulation of ones of the actuators 200 of FIG. 2 in the enabled state. For example, the second simulation 1110 of FIG. 11B can be a portion of the second partial system simulation 1010 of FIG. 10D. FIG. 11B depicts full simulations of actuators 1, 9, 17, and 25 of the actuators 200 of FIG. 2. For example, the model controller 310 can entirely simulate actuators 1, 9, 17, and 25 in the second simulation 1110 while the model controller 310 can partially simulate actuators 2, 10, 18, and 26 in response to replicating the boundary conditions from a donor actuator. For example, the model controller 310 can simulate replicated actuator 2 in response to the model controller 310 replicating the boundary conditions 1019 from donor actuator 1 at the boundary surface of replicated actuator 2. In the example of FIG. 11B, the model controller 310 can identify actuators 1, 9, 17, and 25 as donor actuators and actuators 2, 10, 18, and 26 as recipient or replicated actuators based on the first replication pattern 1011 of FIGS. 10D-10F.

FIG. 11C depicts a third example simulation 1120 of third example fluid flows based on a partial simulation of ones of the actuators 200 of FIG. 2 in the enabled state. For example, the third simulation 1120 of FIG. 11C can be a portion of the second partial system simulation 1010 of FIG. 10D. FIG. 11C depicts full simulations of actuators 1, 9, 17, and 25 of the actuators 200 of FIG. 2. For example, the model controller 310 can entirely simulate actuators 1, 9, 17, and 25 in the third simulation 1120 while partially simulating actuators 2, 10, 18, and 26 in response to replicating the boundary conditions from a donor actuator. For example, the model controller 310 can simulate replicated actuators 2 and 26 in response to the model controller 310 replicating the boundary conditions 1021 from donor actuator 9 at the boundary surface of replicated actuators 2 and 26. In such examples, the model controller 310 can model replicated actuator 10 in response to the model controller 310 replicating the boundary conditions 1019 from donor actuator 1 at the boundary surface of replicated actuator 10. In the example of FIG. 11C, the model controller 310 can identify and/or otherwise assign actuators 1, 9, 17, and 25 as donor actuators and actuators 2, 10, 18, and 26 as recipient or replicated actuators based on a second example replication pattern 1122, such as a random or randomized replication pattern.

FIG. 11D depicts a table 1130 of example assignments 1140 to generate the second replication pattern 1122 of FIGS. 11A-11C. The assignments 1140 denote the donor used for the replicated actuators. In the illustrated example of FIG. 11D, a first group of actuators (Group 1), a second group of actuators (Group 2), a third group of actuators (Group 3), and a fourth group of actuators (Group 4) each include 8 total actuators. For example, Group 1 includes actuators 1-8 of FIGS. 10D-10F and actuator 1 is selected as Donor 1. Group 2 includes actuators 9-16 of FIGS. 10D-10F and actuator 9 is selected as Donor 9. Group 3 includes actuators 17-24 of FIGS. 10D-10F and actuator 17 is selected as Donor 17. Group 4 includes actuators 25-32 of FIGS. 10D-10F and actuator 25 is selected as Donor 1.

In some examples, the model controller 310 of FIG. 3 randomly assigns (e.g., executes a random number generator algorithm or other random assignment algorithm) four donor actuators (e.g., Donor 1, Donor 9, Donor 17, and Donor 25) over 28 replicated actuators (e.g., actuators 2-8, 10-16, 18-24, and 25-32). In such examples, the model controller 310 assigns actuator 1 as a donor actuator (e.g., Donor 1) for use in replicating actuators 3, 4, 10, 12, 15, 22, and 23. In some such examples, the model controller 310 assigns actuator 17 as a donor actuator (e.g., Donor 17) for use in replicating actuators 14, 20, 21, 27, and 28. Alternatively, the model controller 310 can generate any other combination of assignments than the assignments 1140 depicted in the example of FIG. 11D.

FIG. 12A depicts an example portion 1200 of the first partial system simulation 1000 of FIG. 10A and/or the first simulation 1100 of the first example fluid flows of FIG. 11A. The portion 1200 includes perspective views of iso-surfaces of Mach numbers (M) and total pressure (PT). The portion 1200 depicted in FIG. 12A depicts the fluid flow in the vicinity, the proximity, etc., of actuators 8-11 at various Mach numbers (e.g., M=0.2, M=0.4, M=1.0, etc.) or total pressure (e.g., PT=2.3) in response to the model controller 310 completely discretizing and/or otherwise simulating actuators 8-11.

FIG. 12B depicts an example portion 1210 of the second partial system simulation 1010 of FIG. 10D and/or the second simulation 1110 of the second example fluid flows of FIG. 11B. The portion 1210 includes perspective views of iso-surfaces of Mach numbers and total pressure. The portion 1200 depicted in FIG. 12B depicts the fluid flow in the vicinity, the proximity, etc., of actuators 8-11 at various Mach numbers (e.g., M=0.2, M=0.4, M=1.0, etc.) or total pressure (e.g., PT=2.3) in response to the model controller 310 replicating the boundary conditions 1019 of actuator 9 to the boundary surface of actuator 10 based on the first replication pattern 1011 of FIGS. 10D-10F.

FIG. 12C depicts an example portion 1220 of the third simulation 1120 of the third example fluid flows of FIG. 11C. The portion 1220 includes perspective views of iso-surfaces of Mach numbers and total pressure. The portion 1220 depicted in FIG. 12C depicts the fluid flow in the vicinity, the proximity, etc., of actuators 8-11 at various Mach numbers (e.g., M=0.2, M=0.4, M=1.0, etc.) or total pressure (e.g., PT=2.3) in response to the model controller 310 replicating the boundary conditions 1019 of actuator 1 to the boundary surface of actuator 10 based on the second replication pattern 1122 of FIGS. 11A-11C.

FIGS. 13A-13C depict the first partial system simulation 1000 of example fluid flows associated with a complete simulation of the actuators 200 of FIG. 2 in the enabled state. FIG. 13A depicts 32 of the actuators 200, with a left-most one of the actuators 200 (i.e., actuator 1) located at the root of the wing 102 and a right-most one of the actuators located at the tip of the wing 102 (i.e., actuator 32) with actuators 2-31 arranged and/or otherwise disposed in between. Further depicted in FIG. 13A is the first portion view 1002 of FIG. 10, which is depicted in greater detail in FIG. 13B.

FIG. 13B depicts the first portion view 1002 in greater detail. In FIG. 13B, a portion of the actuators 200 of FIG. 13A are depicted. In FIG. 13B, the portion of the actuators 200 includes a set of the actuators 200 including 18 actuators (labeled from 1-18). Further depicted in FIG. 13B is a third portion view 1310, which is depicted in greater detail in FIG. 13C.

FIG. 13C depicts the third portion view 1310 of FIG. 13B in greater detail. In FIG. 13C, a portion of the actuators 200 of FIG. 13B is depicted. In FIG. 13B, the portion of the actuators 200 includes actuators 15-19 of the actuators 200. As depicted in the examples of FIGS. 13A-13C, the instantaneous Mach numbers indicate a relatively random response as the ejection jets are illustrated at various phases of their respective oscillating cycle.

FIGS. 13D-13F depict a third example partial system simulation 1320 of example fluid flows associated with a partial simulation of the actuators 200 of FIG. 2 in the enabled state. The model controller can characterize and/or otherwise represent fluid flows in FIGS. 13D-13F with varying instantaneous Mach numbers (M). FIGS. 13D-13F depict partial system simulations because a portion of a computational domain of a system (e.g., the aircraft 100 of FIG. 1A) is depicted.

FIGS. 13D-13F depicts a partial simulation of the actuators 200 because actuator 17 is fully discretized and, thus, is completely simulated. For example, the model controller 310 can invoke the high-pressure supply 204, the feedback loops 206, the upstream portion of the diffuser 208, and the ejection jets 210 of actuator 17 to be discretized and simulated. Alternatively, the model controller 310 may identify any other one of the actuators 200 as the donor actuator. The model controller 310 can invoke and/or otherwise cause the remaining ones of the actuators (e.g., actuators 1-16 and 18-32) to be partially discretized and, thus, not be completely simulated. For example, the high-pressure supply 204, the feedback loops 206, and the upstream portion of the diffuser 208 of actuators 1-16 and 18-32 are not simulated in FIGS. 13D-13F. In such examples, the model controller 310 can replace the high-pressure supply 204, the feedback loops 206, and the upstream portion of the diffuser 208 of actuators 1-16 and 18-32 with example boundary conditions 1330 that are generated and/or otherwise assigned based on the model controller 310 executing the workflow 900 of FIGS. 9A-9C using a third example replication pattern 1340. The boundary conditions 1330 can correspond to and/or otherwise be an example implementation of the boundary condition(s) 386 of FIG. 3.

In FIG. 13D, the third replication pattern 1340 is representative of a single actuator (e.g., actuator 17) being used for the replication to the remaining ones of the actuators 200. For example, the model controller 310 can identify actuator 17 to be used to replicate the actuation at the other 31 actuators. In such examples, the model controller 310 can fully model actuator 17, and the model controller 310 can use the instantaneous flow properties in the diffuser 208 of actuator 17 as inflow boundary conditions 1330 for each of actuators 1-16 and 18-32 at their respective diffuser 208. Further depicted in FIG. 13D is a portion view 1350, which is shown in greater detail in FIG. 13E.

FIG. 13E depicts the portion view 1350 of FIG. 13D. In FIG. 13E, a portion of the actuators 200 of FIG. 13D are depicted. In FIG. 13E, the portion of the actuators 200 includes actuators 1-18. Further depicted in FIG. 13E is a portion view 1360, which is depicted in greater detail in FIG. 13F.

FIG. 13F depicts the portion view 1360 of FIG. 13E in greater detail. In FIG. 13F, a portion of the actuators 200 of FIG. 13E is depicted. In FIG. 13F, the portion of the actuators 200 includes actuators 15, 16, 17, 18, and 19 of the actuators 200. In FIG. 13F, the model controller 310 can replace the high-pressure supply 204, the feedback loops 206, and the diffuser 208 of actuators 15, 16, 18, and 19 with the boundary conditions 1330 of actuator 17. In FIG. 13F, the model controller 310 can replicate the boundary conditions 1330 at the boundary surface of the diffuser 208 of actuator 17 at actuators 15, 16, 18, and 19. Advantageously, the ejection jets 210 of actuators 15, 16, 18, 19, etc., can be simulated and/or otherwise generated using the boundary conditions 1330 of actuator 17 instead of discretizing the entirety of actuators 15, 16, 18, 19, etc. For example, the jet plume of the ejection jets 210 of actuators 15, 16, 18, and 19 are similar (e.g., substantially similar based on a tolerance in a range of 0.1-1.0% or any other range) to the jet plume of the ejection jet 210 of actuator 17.

In FIGS. 13D-13F, although the actuators 1-32 operate at the same strokes, the simulation or modeling results produce a similar (e.g., substantially similar based on a tolerance in a range of 0.1-1.0% or any other range) flow and download level as in the other flow control cases (e.g., the first replication pattern 1011, the second replication pattern 1122, etc.). The model controller 310 can execute a replication operation of using one actuator (e.g., actuator 17) to generate a first quantity of points in the grid system (e.g., approximately 66 million grid points) while the complete simulation depicted in FIGS. 13A-13C can have a second quantity of points in the grid system, which is greater than the first quantity of points. Advantageously, the quantity of grid points using the third replication pattern 1340 depicted in FIGS. 13D-13F can result in an approximately 48% reduction in grid points relative the fully simulated example of FIGS. 13A-13C. Advantageously, the corresponding computational savings (e.g., reduction in computing resources, reduction in execution time, etc.) of the examples of FIGS. 13D-13F can be approximately 50% compared to the examples of FIGS. 13A-13C.

Figure 14A:
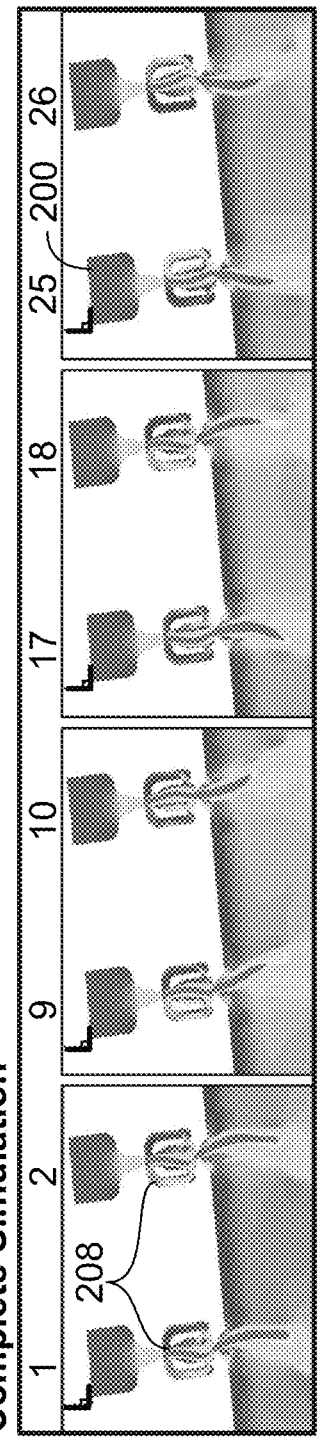
FIG. 14A depicts a simulation of first example fluid flows based on a complete simulation of the example actuators of FIG. 2 in the enabled state.

FIG. 14A depicts a fourth example simulation 1400 of fourth example fluid flows based on a complete simulation of the actuators 200 of FIG. 2 in the enabled state. For example, the fourth simulation 1400 of FIG. 14A can be a portion of the first partial system simulation 1000 of FIG. 10A. FIG. 14A depicts full simulations of actuators 1, 2, 9, 10, 17, 18, 25, and 26 of the actuators 200 of FIG. 2. For example, the model controller 310 can cause actuators 1, 2, 9, 10, 17, 18, 25, and 26 in the fourth simulation 1400 to be entirely simulated.

Figure 14B:
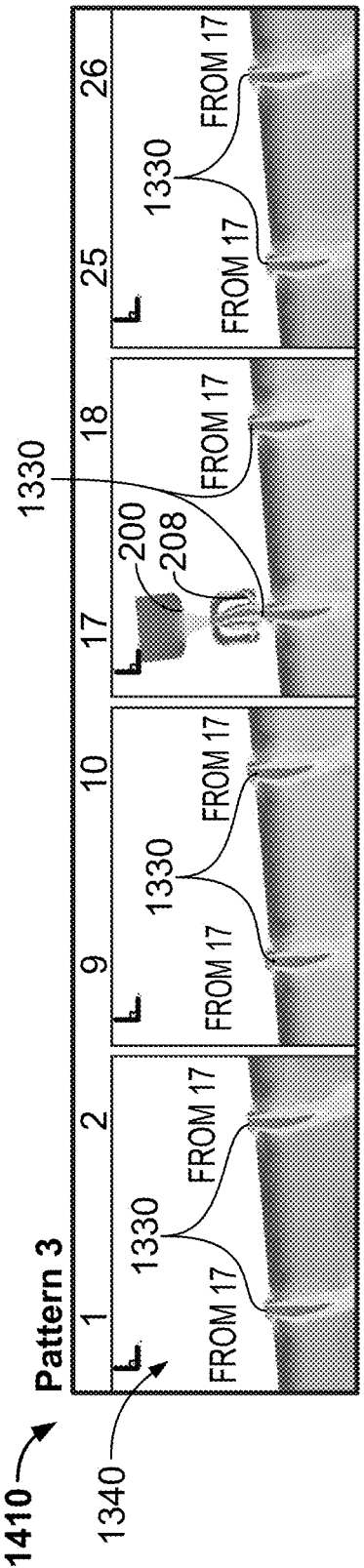
FIG. 14B depicts a simulation of second example fluid flows based on a partial simulation of the example actuators of FIG. 2 based on the example workflow of FIG. 9 using the third example replication pattern.

FIG. 14B depicts a fifth example simulation 1410 of fifth example fluid flows based on a partial simulation of ones of the actuators 200 of FIG. 2 in the enabled state. For example, the fifth simulation 1410 of FIG. 14B can be a portion of the third partial system simulation 1320 of FIG. 13D. FIG. 14B depicts a full simulation of actuator 17 of the actuators 200 of FIG. 2. For example, actuator 17 in the fifth simulation 1410 is entirely simulated while actuators 1, 2, 9, 10, 18, 25, and 26 are simulated in response to replicating the boundary conditions from a donor actuator, such as actuator 17. For example, replicated actuators 1, 2, 9, 10, 18, 25, and 26 are simulated in response to replicating the boundary conditions 1330 from donor actuator 17 at the respective boundary surface of replicated actuators 1, 2, 9, 10, 18, 25, and 26. In the example of FIG. 14B, actuator 17 is identified as a donor actuator and actuators 1, 2, 9, 10, 18, 25, and 26 are identified as recipient or replicated actuators based on the third replication pattern 1340 of FIGS. 13D-13F.

Figure 15A:
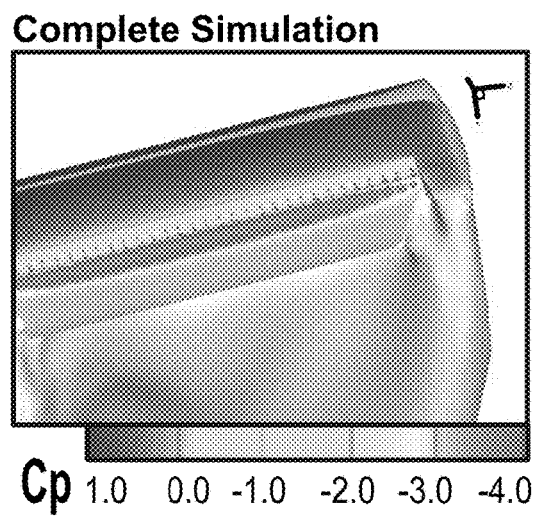
FIG. 15A depicts a first system simulation including example fluid flows based on a complete simulation of the example actuators of FIG. 2 in the enabled state.

FIG. 15A depicts a first example complete system simulation 1500 of example fluid flows associated with the complete simulation of the actuators 200 of FIG. 2 in the enabled state. The first complete system simulation 1500 depicts the global flow fields (e.g., the output flow fields, the output global flow fields, etc.) generated by the model controller 310 in response to the model controller 310 fully discretizing and/or otherwise simulating each of the actuators 200.

Figure 15B:
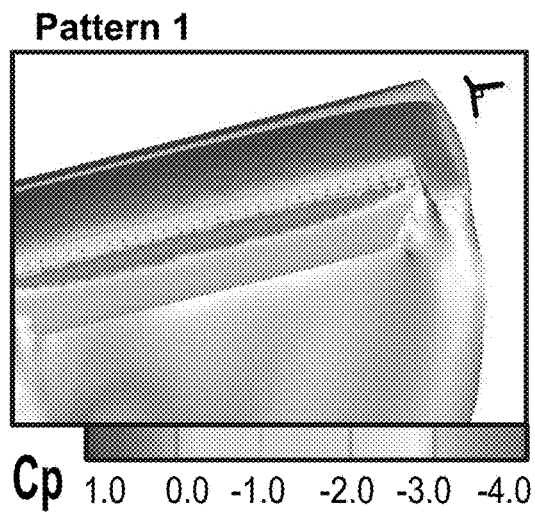
FIG. 15B depicts a second system simulation including example fluid flows based on a partial simulation of the example actuators of FIG. 2 in the enabled state based on the example workflow of FIG. 9 using the first example replication pattern.

FIG. 15B depicts a second example complete simulation 1510 of example fluid flows associated with the partial simulation of ones of the actuators 200 of FIG. 2 in the enabled state. The second complete system simulation 1510 depicts the global flow fields generated by the model controller 310. The model controller 310 can generate the global flow fields in FIG. 15B in response to the model controller 310 (1) fully discretizing and/or otherwise simulating ones of actuators 200, such as actuators 1, 9, 17, and 25 while (2) simulating the remaining ones of the actuators 200, such as actuators 2-8, 10-16, 18-24, and 26-32, using the boundary conditions based on the first replication pattern 1011 of FIGS. 10D-10F.

Figure 15C:
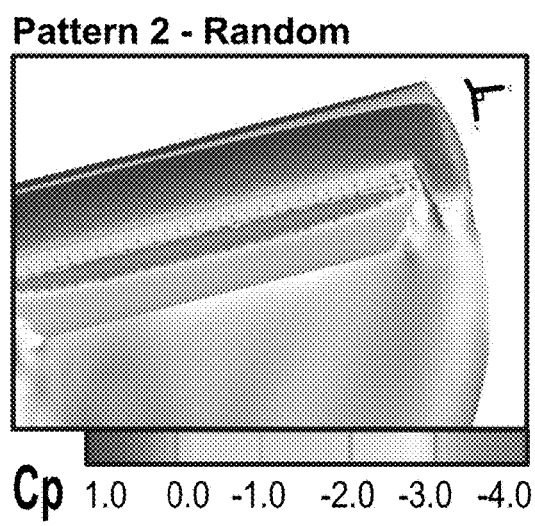
FIG. 15C depicts a third system simulation including example fluid flows based on a partial simulation of the example actuators of FIG. 2 in the enabled state based on the example workflow of FIG. 9 using the second example replication pattern.

FIG. 15C depicts a third example complete simulation 1520 of example fluid flows associated with the partial simulation of ones of the actuators 200 of FIG. 2 in the enabled state. The third complete system simulation 1520 depicts the global flow fields generated by the model controller 310. The model controller 310 can generate the global flow fields in FIG. 15C in response to the model controller 310 (1) fully discretizing and/or otherwise simulating ones of actuators 200, such as actuators 1, 9, 17, and 25 while (2) simulating the remaining ones of the actuators 200, such as actuators 2-8, 10-16, 18-24, and 26-32, using the boundary conditions based on the second replication pattern 1122 of FIGS. 11A-11C.

Figure 15D:
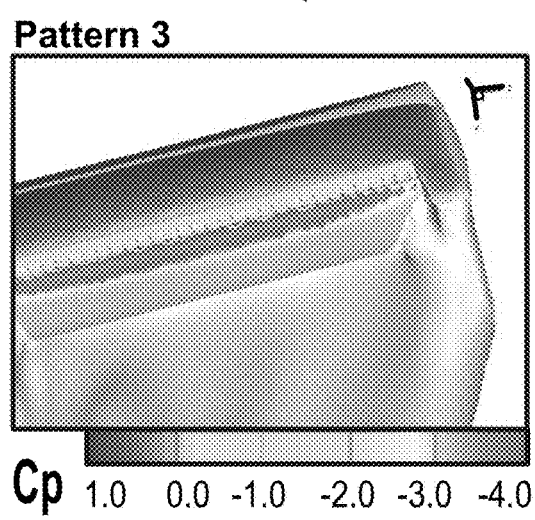
FIG. 15D depicts a fourth system simulation including example fluid flows based on a partial simulation of the example actuators of FIG. 2 in the enabled state based on the example workflow of FIG. 9 using the third example replication pattern.

FIG. 15D depicts a fourth example complete simulation 1530 of example fluid flows associated with the partial simulation of one of the actuators 200 of FIG. 2 in the enabled state. The fourth complete system simulation 1530 depicts the global flow fields generated by the model controller 310. The model controller 310 can generate the global flow fields in FIG. 15D in response to the model controller 310 (1) fully discretizing and/or otherwise simulating one of the actuators 200, such as actuator 17, while (2) simulating the remaining ones of the actuators 200, such as actuators 1-16 and 18-32, using the boundary conditions based on the third replication pattern 1340 of FIGS. 13A-13C.

Advantageously, the comparison of the global flow fields of FIGS. 15A, 15B, 15C, and 15D demonstrates that replication with the first replication pattern 1011, the second replication pattern 1122, or the third replication pattern 1340 yields very similar flow fields, with similar (e.g., substantially similar, nearly identical, etc.) download force. Advantageously, while the first complete system simulation 1500 of FIG. 15A can use a first grid of a first quantity of points (e.g., approximately 129 million points), the second complete system simulation 1510 of FIG. 15B can use a second grid of a second quantity of points (e.g., approximately 72 million points), where the second quantity is less than the first quantity (e.g., less than by approximately 43%). In the examples of FIGS. 15C-15D, the third complete system simulation 1520 and the fourth complete system simulation 1530 can have the same quantity of points as the second quantity of points and, thus, can have similar computational savings in response to having fewer points to simulate than the complete simulation of the example of FIG. 15A.

Advantageously, a first computational time of executing the second complete system simulation 1510 can be less than a second computational time of executing the first complete system simulation 1500. For example, the first computational time can be approximately 46% less than the second computational time. In such examples, the first computational time can be less than the second computational time in response to using a smaller computational domain (e.g., a smaller grid) that is otherwise needed for the inner grids of the fully simulated ones of the actuators 200. In the examples of FIGS. 15C-15D, the third complete system simulation 1520 and the fourth complete system simulation 1530 can have reduced computational times than the first computational time and, thus, can achieve computational savings in response to having fewer grid points to simulate than the complete simulation of the example of FIG. 15A.

Flowcharts representative of example hardware logic, machine readable instructions, hardware implemented state machines, and/or any combination thereof for implementing the model controller 310 of FIG. 3 is shown in FIGS. 16-19. The machine readable instructions may be one or more executable programs or portion(s) of an executable program for execution by a computer processor and/or processor circuitry, such as the processor 2012 shown in the example processor platform 2000 discussed below in connection with FIG. 20. The program may be embodied in software stored on a non-transitory computer readable storage medium such as a CD-ROM, a floppy disk, a hard drive, a DVD, a Blu-ray disk, or a memory associated with the processor 2012, but the entire program and/or parts thereof could alternatively be executed by a device other than the processor 2012 and/or embodied in firmware or dedicated hardware. Further, although the example program is described with reference to the flowcharts illustrated in FIGS. 16-19, many other methods of implementing the example model controller 310 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated Circuit (ASIC), a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 16-19 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 16:
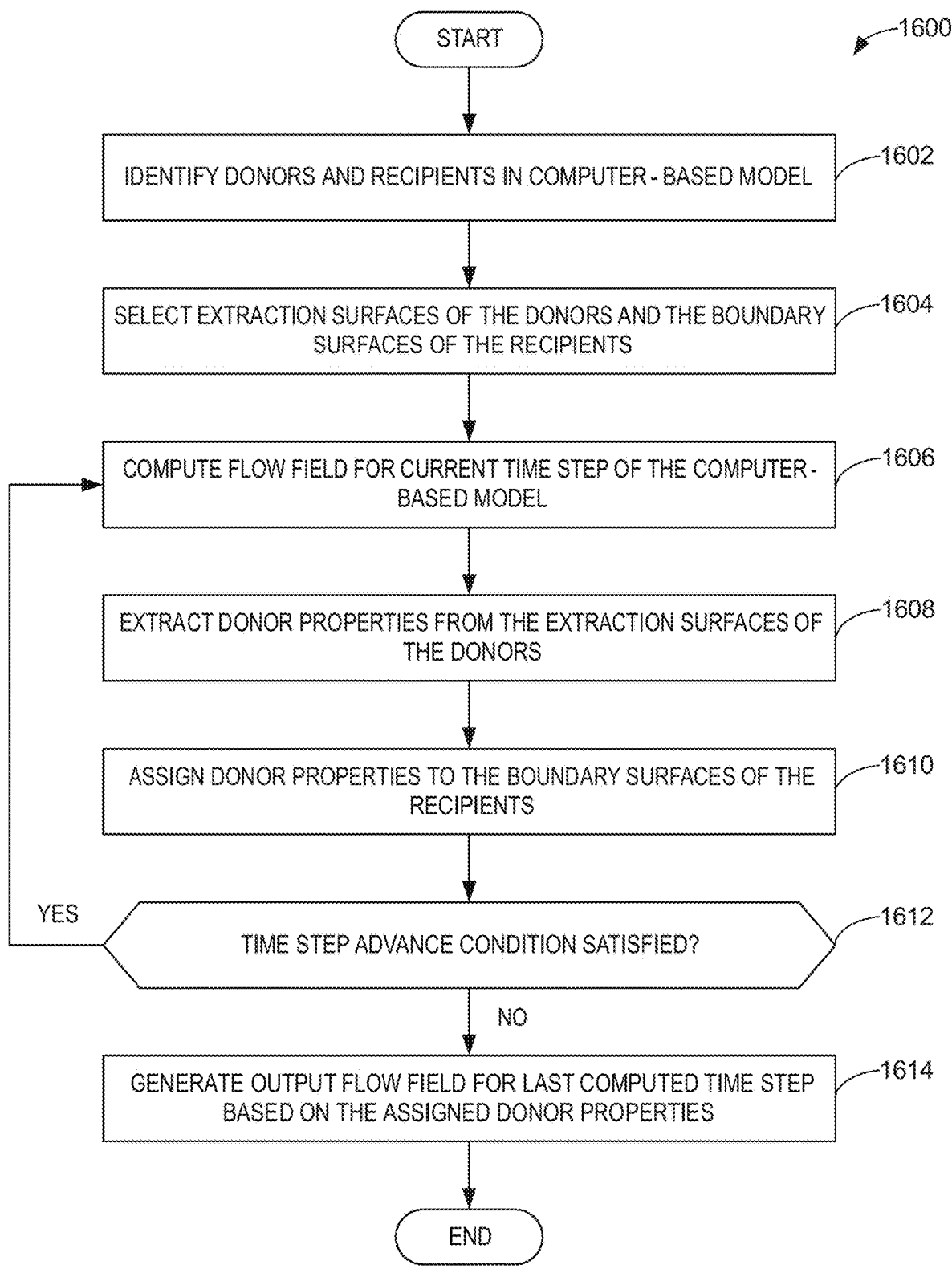
FIG. 16 is a flowchart representative of example machine readable instructions that may be executed to implement the model controller of FIG. 3 to generate an output flow field for a computer-based model based on assigning donor properties to recipient properties.

FIG. 16 is a flowchart representative of example machine readable instructions 1600 that may be executed to implement the model controller 310 of FIG. 3 to generate an output flow field for a computer-based model based on assigning donor properties to recipient properties. The machine readable instructions 1600 of FIG. 16 begin at block 1602, at which the model controller 310 can identify donors and recipients in a computer-based model. For example, the property identifier 330 (FIG. 3) can identify actuator 1, 9, 17, and 25 of the actuators 200 of FIG. 10A as donor actuators and identify actuators 2-8, 10-16, 18-24, and 26-32 of the actuators 200 as recipient actuators.

At block 1604, the model controller 310 selects extraction surfaces of the donors and the boundary surfaces of the recipients. For example, the property extractor 340 (FIG. 3) can select the extraction surface of the diffuser 208 of respective actuators 1, 9, 17, and 25 and the boundary surface of the diffuser 208 of respective actuators 2-8, 10-16, 18-24, and 26-32.

At block 1606, the model controller 310 computes a flow field for a current time step of the computer-based model. For example, the flow field generator 370 (FIG. 3) can generate the flow field depicted in the second partial system simulation 1010 of FIGS. 10D-10F, the second complete system simulation 1510 of FIG. 15B, etc., for a current time step.

At block 1608, the model controller 310 extracts donor properties from the extraction surfaces of the donors. For example, the property extractor 340 can extract the properties 384 (FIG. 3) from the extraction surfaces of the donors, such as aerodynamic conditions, boundary conditions, density, one or more components of a velocity vector, pressure, energy, etc., and/or a combination thereof. In such examples, the property extractor 340 can extract the properties 384 from the extraction surfaces of actuators 1, 9, 17, and 25.

At block 1610, the model controller 310 assigns donor properties to the boundary surfaces of the recipients. For example, the property assignor 360 (FIG. 3) can assign the donor properties from actuator 1 to the boundary surfaces of actuators 2-8.

At block 1612, the model controller 310 determines whether the condition is satisfied to advance the time step of the computer-based model. For example, the condition can be satisfied when the flow field generator 370 determines any of the following has occurred: that a hard stop has been reached, a fixed number of timesteps have elapsed and/or otherwise been executed, or a convergence has been reached and/or otherwise approached.

If, at block 1612, the model controller 310 determines that the time step advance condition has been satisfied and, thus, determines to advance the time step of the computer-based model (e.g., from a first time step to a second time step), control returns to block 1606 to compute the flow field for the next time step of the computer-based model.

If, at block 1612, the model controller 310 determines that the time step advance condition has not been satisfied and, thus, determines not to advance the time step of the computer-based model, then, at block 1614, the model controller 310 generates an output flow field for the last computed time step based on the assigned donor properties. For example, the flow field generator 370 can generate the output flow fields depicted in the second partial system simulation 1010 of FIGS. 10D-10F, the second complete system simulation 1510 of FIG. 15B, etc., for the last computed time step. In response to generating the output flow field for the last computed time step based on the assigned donor properties at block 1614, the machine readable instructions 1600 of FIG. 16 conclude.

Figure 17:
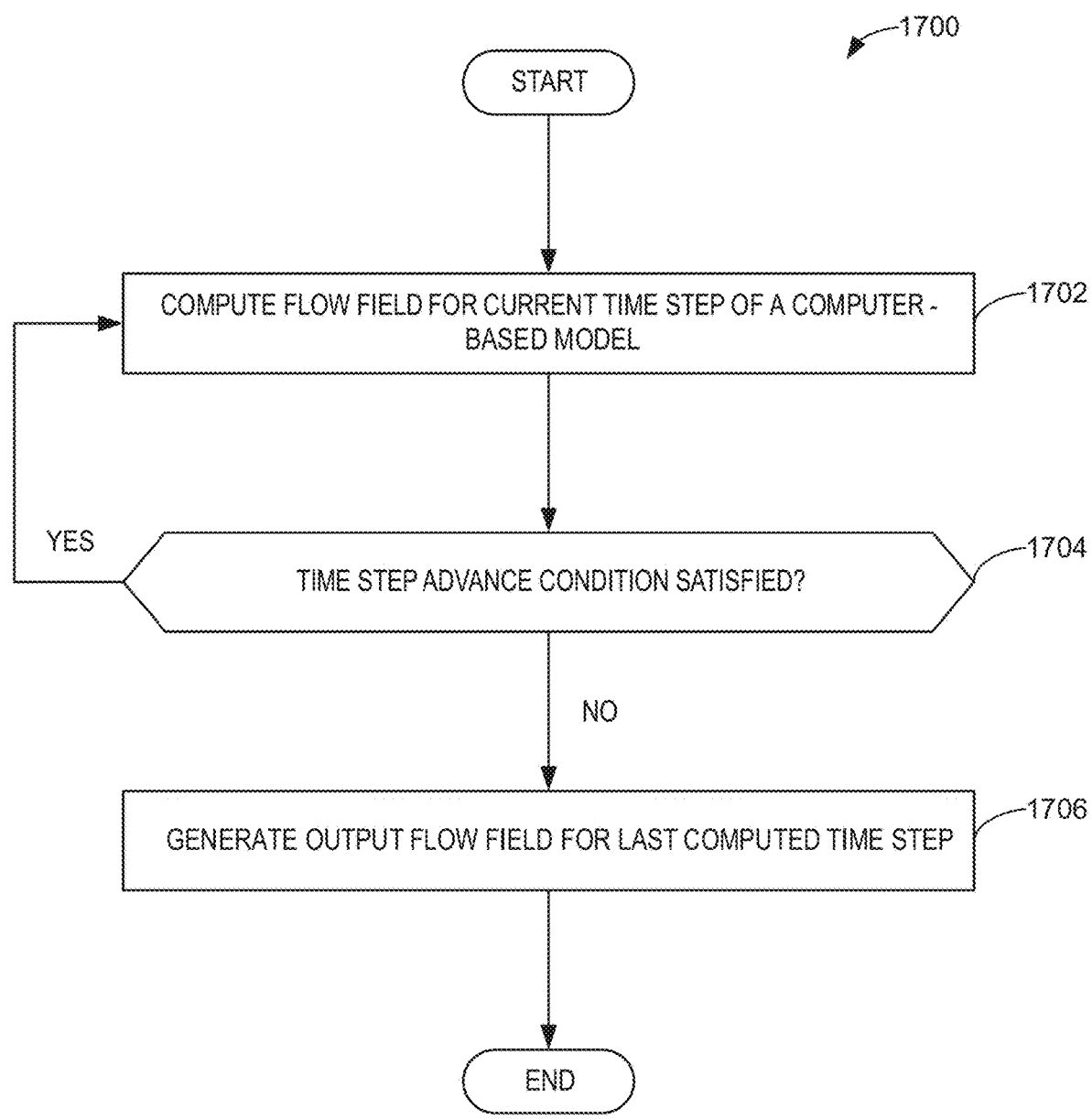
FIG. 17 is a flowchart representative of example machine readable instructions that may be executed to implement the model controller of FIG. 3 to generate an output flow field for a computer-based model based on not assigning donor properties to recipient properties.

FIG. 17 is a flowchart representative of example machine readable instructions 1700 that may be executed to implement the model controller 310 of FIG. 3 to generate an output flow field for a computer-based model based on not assigning donor properties to recipient properties. The machine readable instructions 1700 of FIG. 17 begin at block 1702, at which the model controller 310 computes a flow field for a current time step of the computer-based model. For example, the flow field generator 370 (FIG. 3) can generate the flow field depicted in the first partial system simulation 1000 of FIGS. 10A-10C, the first complete system simulation 1500 of FIG. 15A, etc., for a current time step.

At block 1704, the model controller 310 determines whether the condition is satisfied to advance the time step of the computer-based model. For example, the condition can be satisfied when the flow field generator 370 determines any of the following has occurred: that a hard stop has been reached, a fixed number of timesteps have elapsed and/or otherwise been executed, or a convergence has been reached and/or otherwise approached.

If, at block 1704, the model controller 310 determines that the condition has been satisfied and, thus, determines to advance the time step of the computer-based model (e.g., from a first time step to a second time step), control returns to block 1702 to compute the flow field for the next time step of the computer-based model.

If, at block 1704, the model controller 310 determines that the condition has not been satisfied and, thus, determines not to advance the time step of the computer-based model, then, at block 1706, the model controller 310 generates an output flow field for the last computed time step. For example, the flow field generator 370 can generate the output flow fields depicted in the first partial system simulation 1000 of FIGS.

10A-10C, the first complete system simulation 1500 of FIG. 15A, etc., for the last computed time step. In response to generating the output flow field for the last computed time step at block 1706, the machine readable instructions 1700 of FIG. 17 conclude.

The machine readable instructions 1700 of FIG. 17 are representative of computing a flow field for a physical domain that can have a first computing execution time to run and/or otherwise execute. The machine readable instructions 1600 of FIG. 16 are representative of computing a flow field for the physical domain that can have a second computing execution time to run and/or otherwise execute. Advantageously, the second computing execution time can be less than the first computing execution time in response to the machine readable instructions 1600 of FIG. 16 assigning the properties 384 from the donor actuators to the recipient actuators. Advantageously, the machine readable instructions 1600 of FIG. 16 can demand fewer computing resources, such as processing power, memory storage, etc., than the computing resources demanded by the machine readable instructions 1700 of FIG. 17.

Figure 18:
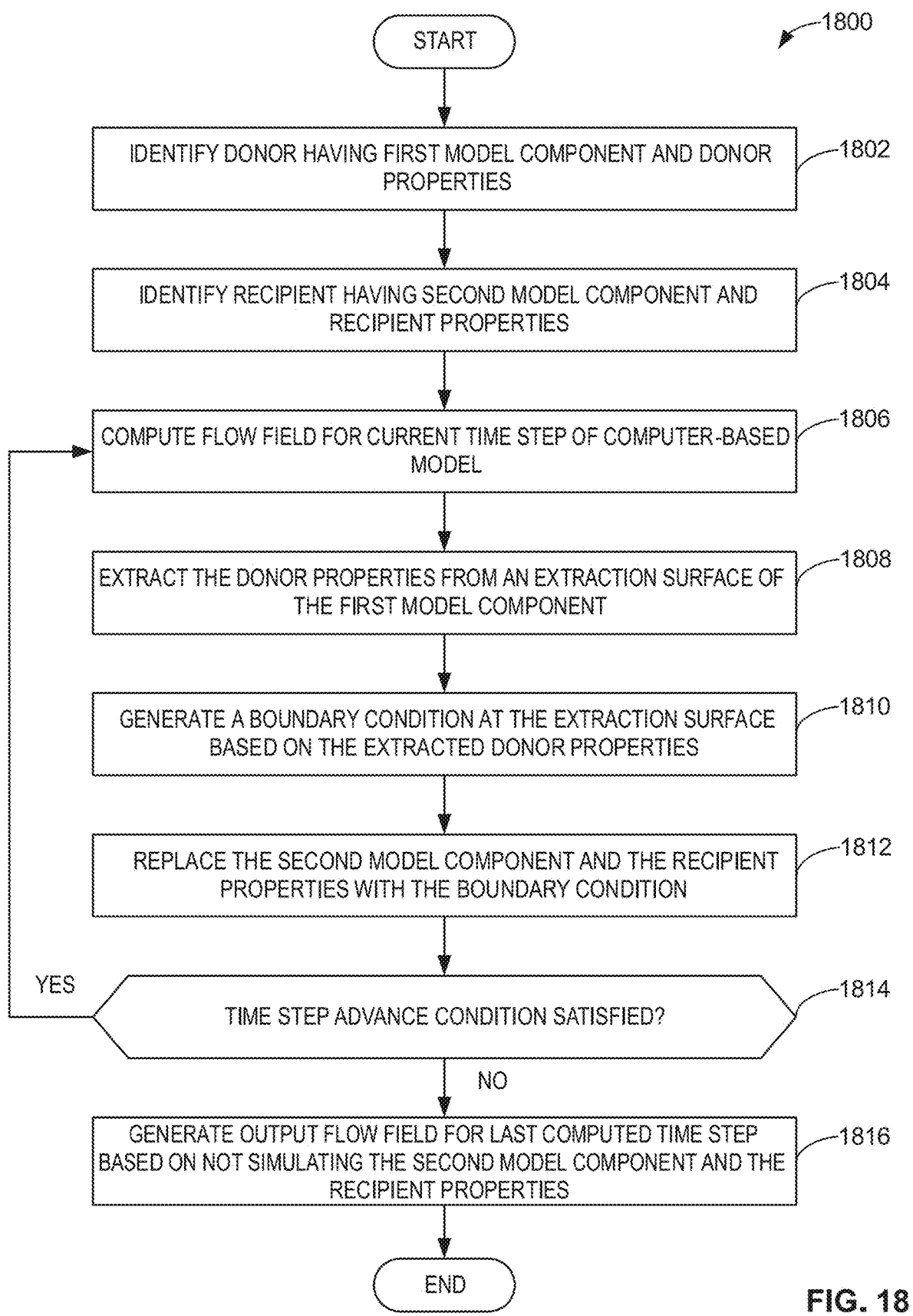
FIG. 18 is a flowchart representative of example machine readable instructions that may be executed to implement the model controller of FIG. 3 to generate an output flow field for a computer-based model based on replacing recipient properties with a donor boundary condition.

FIG. 18 is a flowchart representative of example machine readable instructions 1800 that may be executed to implement the model controller 310 of FIG. 3 to generate an output flow field for a computer-based model based on replacing recipient properties with a donor boundary condition. The machine readable instructions 1800 of FIG. 18 begin at block 1802, at which the model controller 310 identifies a donor having a first model component and donor properties. For example, the property identifier 330 (FIG. 3) can identify actuator 9 of the actuators 200 as depicted in FIGS. 10D-10F. In such examples, the property identifier 330 can identify actuator 9 as having a first model component, such as the diffuser 208 and the properties 384 associated with the diffuser 208 and/or portion(s) therein.

At block 1804, the model controller 310 identifies a recipient having a second model component and recipient properties. For example, the property identifier 330 can identify actuator 10 of the actuators 200 as depicted in FIGS. 10D-10F. In such examples, the property identifier 330 can identify actuator 10 as having a second model component, such as the diffuser 208 and the properties 384 associated with the diffuser 208 and/or portion(s) therein.

At block 1806, the model controller 310 computes a flow field for a current time step of a computer-based model. For example, the flow field generator 370 (FIG. 3) can generate the flow field depicted in the second partial system simulation 1010 of FIGS. 10D-10F, the second complete system simulation 1510 of FIG. 15B, etc., for a current time step.

At block 1808, the model controller 310 extracts donor properties from an extraction surface of the first model component. For example, the property extractor 340 can extract the properties 384 (FIG. 3) from the extraction surface of the diffuser 208 of actuator 9, such as aerodynamic conditions, boundary conditions, density, one or more components of a velocity vector, pressure, energy, etc., and/or a combination thereof.

At block 1810, the model controller 310 generates a boundary condition at the extraction surface based on the extracted donor properties. For example, the boundary condition generator 350 (FIG. 3) can generate one of the boundary condition(s) 386 (FIG. 3) at the outer surface of the diffuser 208 based on the properties 384 associated with the outer surface.

At block 1812, the model controller 310 replaces the second model component and the recipient properties with the boundary condition. For example, the property assignor 360 (FIG. 3) can assign the one of the boundary condition(s) 386 in place of the diffuser 208 and the properties 384 associated with actuator 10.

At block 1814, the model controller 310 determines whether the condition is satisfied to advance the time step of the computer-based model. For example, the condition can be satisfied when the flow field generator 370 determines any of the following has occurred: that a hard stop has been reached, a fixed number of timesteps have elapsed and/or otherwise been executed, or a convergence has been reached and/or otherwise approached.

If, at block 1814, the model controller 310 determines that the condition has been satisfied and, thus, determines to advance the time step of the computer-based model (e.g., from a first time step to a second time step), control returns to block 1806 to compute the flow field for the next time step of the computer-based model.

If, at block 1814, the model controller 310 determines that the condition has not been satisfied and, thus, determines not to advance the time step of the computer-based model, then, at block 1816, the model controller 310 generates an output flow field for the last computed time step based on not simulating the second model component and the recipient properties. For example, the flow field generator 370 can generate the output flow fields depicted in the second partial system simulation 1010 of FIGS. 10D-10F, the second complete system simulation 1510 of FIG. 15B, etc., for the last computed time step by simulating the actuation of actuator 10 with the one of the boundary condition(s) 386. In response to generating the output flow field for the last computed time step based on not simulating the second model component and the recipient properties at block 1816, the machine readable instructions 1800 of FIG. 18 conclude.

Figure 19:
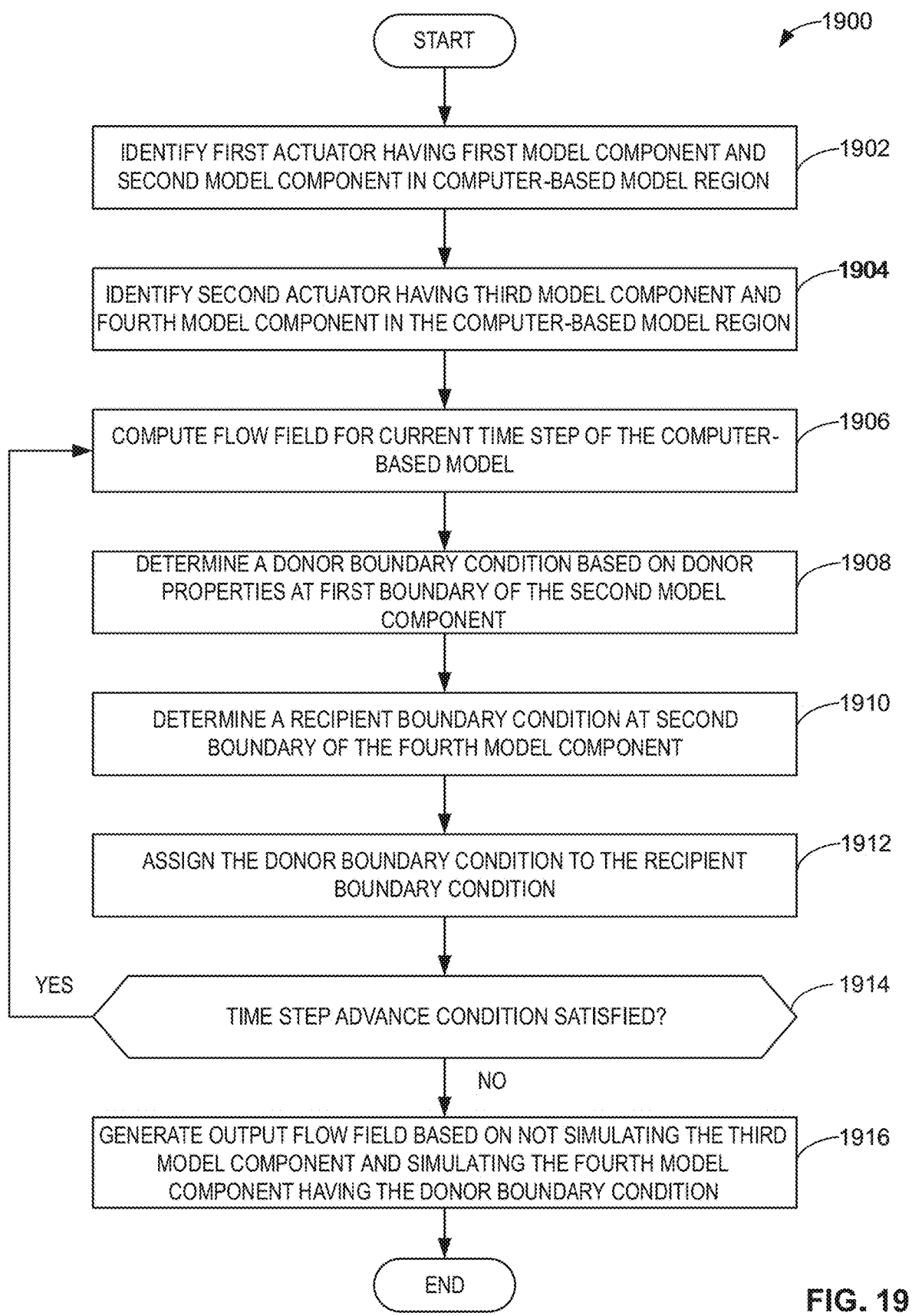
FIG. 19 is a flowchart representative of example machine readable instructions that may be executed to implement the model controller of FIG. 3 to generate an output flow field for a computer-based model based on a replacement of boundary condition(s).

FIG. 19 is a flowchart representative of example machine readable instructions 1900 that may be executed to implement the model controller 310 of FIG. 3 to generate an output flow field for a computer-based model based on a replacement of boundary condition(s). The machine readable instructions 1900 of FIG. 19 begin at block 1902, at which the model controller 310 identifies a first actuator (e.g., a donor actuator) having a first model component and a second model component in a computer-based model region. For example, the property identifier 330 (FIG. 3) can identify actuator 17 of the actuators 200 as depicted in FIGS. 13D-13F. In such examples, the property identifier 330 can identify actuator 17 as having a first model component, such as the feedback loops 206, and a second model component, such as the diffuser 208.

At block 1904, the model controller 310 identifies a second actuator (e.g., a recipient actuator) having a third model component and a fourth model component in the computer-based model region. For example, the property identifier 330 can identify actuator 18 of the actuators 200 as depicted in FIGS. 13D-13F. In such examples, the property identifier 330 can identify actuator 18 as having a third model component, such as the feedback loops 206, and a fourth model component, such as the diffuser 208.

At block 1906, the model controller 310 computes a flow field for a current time step of a computer-based model. For example, the flow field generator 370 (FIG. 3) can generate the flow field depicted in the third partial system simulation 1320 of FIGS. 13D-13F, the third complete system simulation 1520 of FIG. 15C, etc., for a current time step.

At block 1908, the model controller 310 determines a donor boundary condition based on donor properties at a first boundary of the second model component. For example, the boundary condition generator 350 (FIG. 3) can determine a donor boundary condition based on the properties 384 at an outer boundary, an outer surface, etc., of the diffuser 208 of actuator 17 that is in fluid communication with an airflow.

At block 1910, the model controller 310 determines a recipient boundary condition at a second boundary of the fourth model component. For example, the boundary condition generator 350 can determine a recipient boundary condition, such as one of the boundary conditions 1330 of FIG. 13D, based on the properties 384 at an outer boundary, an outer surface, etc., of the diffuser 208 of actuator 18 that is in fluid communication with an airflow.

At block 1912, the model controller 310 assigns the donor boundary condition to the recipient boundary condition. For example, the property assignor 360 (FIG. 3) can assign the one of the boundary conditions 1330 associated with actuator 17 to the outer surface of the diffuser 208 of actuator 18.

At block 1914, the model controller 310 determines whether the condition is satisfied to advance the time step of the computer-based model. For example, the condition can be satisfied when the flow field generator 370 determines any of the following has occurred: that a hard stop has been reached, a fixed number of timesteps have elapsed and/or otherwise been executed, or a convergence has been reached and/or otherwise approached.

If, at block 1914, the model controller 310 determines that the condition is satisfied and, thus, determines to advance the time step of the computer-based model (e.g., from a first time step to a second time step), control returns to block 1906 to compute the flow field for the next time step of the computer-based model.

If, at block 1914, the model controller 310 determines that the condition is not satisfied and, thus, determines not to advance the time step of the computer-based model, then, at block 1916, the model controller 310 generates an output flow field based on not simulating the third model component and simulating the fourth model component having the donor boundary condition. For example, the flow field generator 370 can generate the output flow fields depicted in the third partial system simulation 1320 of FIGS. 13D-13F, the third complete system simulation 1520 of FIG. 15C, etc., for the last computed time step by simulating the actuation of actuator 18 by replacing the feedback loops 206 and the diffuser 208 with the one of the boundary condition(s) 386. In response to generating the output flow field for the last computed time step based on not simulating the third model component and simulating the fourth model component having the donor boundary condition at block 1916, the machine readable instructions 1900 of FIG. 19 conclude.

Figure 20:
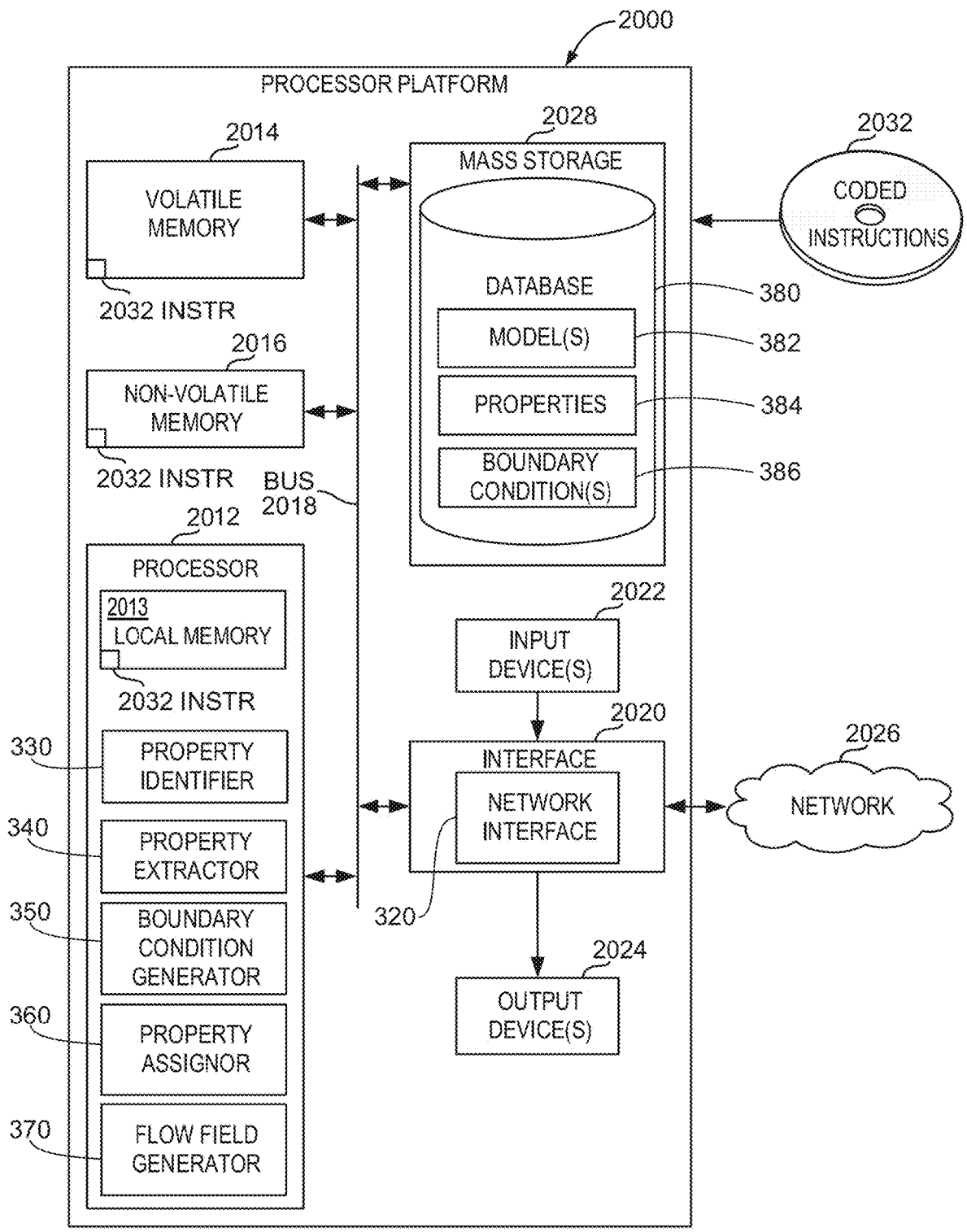
FIG. 20 is a block diagram of an example processing platform structured to execute the instructions of FIGS. 16-19 to implement the model controller of FIG. 3.

FIG. 20 is a block diagram of an example processor platform 2000 structured to execute the instructions of FIGS. 16-19 to implement the model controller 310 of FIG. 3. The processor platform 2000 can be, for example, a server, a personal computer, a workstation, a self-learning machine (e.g., a neural network), a headset or other wearable device, or any other type of computing device.

The processor platform 2000 of the illustrated example includes a processor 2012. The processor 2012 of the illustrated example is hardware. For example, the processor 2012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 2012 implements the example property identifier 330, the example property extractor 340, the example boundary condition generator 350, the example property assignor 360, and the example flow field generator 370 of FIG. 3.

The processor 2012 of the illustrated example includes a local memory 2013 (e.g., a cache). The processor 2012 of the illustrated example is in communication with a main memory including a volatile memory 2014 and a non-volatile memory 2016 via a bus 2018. The volatile memory 2014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2016 may be implemented by flash memory and/or any other desired type of memory device. Access to the main memory 2014, 2016 is controlled by a memory controller.

The processor platform 2000 of the illustrated example also includes an interface circuit 2020. The interface circuit 2020 may be implemented by any type of interface standard, such as an Ethernet interface, a universal serial bus (USB), a Bluetooth® interface, a near field communication (NFC) interface, and/or a PCI express interface. In this example, the interface circuit 2020 implements the network interface 320 of FIG. 3.

In the illustrated example, one or more input devices 2022 are connected to the interface circuit 2020. The input device(s) 2022 permit(s) a user to enter data and/or commands into the processor 2012. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 2024 are also connected to the interface circuit 2020 of the illustrated example. The output devices 2024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speaker. The interface circuit 2020 of the illustrated example, thus, typically includes a graphics driver card, a graphics driver chip and/or a graphics driver processor.

The interface circuit 2020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2000 of the illustrated example also includes one or more mass storage devices 2028 for storing software and/or data. Examples of such mass storage devices 2028 include floppy disk drives, hard drive disks, compact disk drives, Blu-ray disk drives, redundant array of independent disks (RAID) systems, and digital versatile disk (DVD) drives. In this example, the one or more mass storage devices 2028 implements the example database 380, the example model(s) 382, the example properties 384, and the example boundary condition(s) 386 of FIG. 3.

The machine executable instructions 2032 of FIGS. 16-19 may be stored in the mass storage device 2028, in the volatile memory 2014, in the non-volatile memory 2016, and/or on a removable non-transitory computer readable storage medium such as a CD or DVD.

Figure 21:
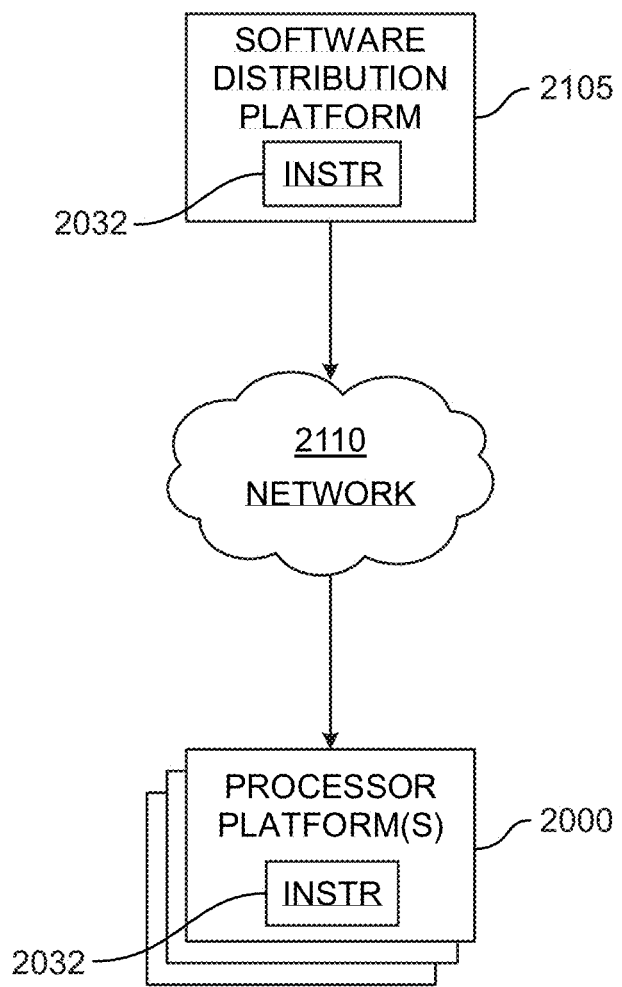
FIG. 21 is a block diagram of an example software distribution platform to distribute software (e.g., software corresponding to the example computer readable instructions of FIGS. 16-19) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 2105 to distribute software such as the example computer readable instructions 2032 of FIG. 200 to third parties is illustrated in FIG. 21. The example software distribution platform 2105 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 2032 of FIG. 20. The third parties may be consumers, users, retailers, OEMs, etc., who purchase and/or license the software for use and/or re-sale and/or sub-licensing. In the illustrated example, the software distribution platform 2105 includes one or more servers and one or more storage devices. The storage devices store the computer readable instructions 2032, which may correspond to the example computer readable instructions 1600, 1700, 1800, 1900 of FIGS. 16-19, as described above. The one or more servers of the example software distribution platform 2105 are in communication with a network 2110, which may correspond to any one or more of the Internet and/or any of the example networks described above, such as the network 392 of FIG. 3 and/or the network 2026 of FIG. 20. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 2032 from the software distribution platform 2105. For example, the software, which may correspond to the example computer readable instructions 1600, 1700, 1800, 1900 of FIGS. 16-19, may be downloaded to the example processor platform 2000, which is to execute the computer readable instructions 2032 to implement the model controller 310 of FIG. 3. In some example, one or more servers of the software distribution platform 2105 periodically offer, transmit, and/or force updates to the software (e.g., the example computer readable instructions 2032 of FIG. 20) to ensure improvements, patches, updates, etc., are distributed and applied to the software at the end user devices.

From the foregoing, it will be appreciated that example systems, methods, apparatus, and articles of manufacture have been disclosed that improve fluid flow simulations. The disclosed systems, methods, apparatus, and articles of manufacture improve the efficiency of using a computing device by identifying donor actuators from which to assign associated boundary conditions to replicated actuators and, thus, reduce the computing resources demanded by a computer-based model to simulate the donor actuators and the replicated actuators. The disclosed systems, methods, apparatus, and articles of manufacture can execute simulations of computer-based models in less execution time based on the assignment(s) of donor boundary condition(s) to replicated actuators. The disclosed systems, methods, apparatus, and articles of manufacture are accordingly directed to one or more improvement(s) in the functioning of a computer.

Example methods, apparatus, systems, and articles of manufacture to improve fluid flow simulations are disclosed herein. Further examples and combinations thereof include the following:

Example 1 includes an apparatus to improve execution of a computer-based model, the apparatus comprising a property identifier to, prior to execution of the computer-based model, identify donors and recipients representative of one or more model regions of the computer-based model to simulate for a plurality of time steps including a first time step and a second time step, the donors having donor properties, in response to computing a flow field for the first time step of the computer-based model a property extractor to extract the donor properties from extraction surfaces of the donors, and a property assignor to assign the donor properties to boundary surfaces of respective ones of the recipients, and a flow field generator to generate an output flow field for the second time step based on the recipients having the assigned donor properties.

Example 2 includes the apparatus of example 1, wherein the flow field generator is to execute the computer-based model to simulate aerodynamic fluid flows associated with a flight control surface of an aircraft, the flight control surface having actuators to expel a pressurized fluid, and simulate the pressurized fluid affecting the aerodynamic fluid flows proximate the flight control surface.

Example 3 includes the apparatus of example 1, wherein the one or more model regions are representative of one or more simulated portions of a flight control surface of an aircraft, the donor properties representative of aerodynamic conditions proximate the flight control surface, the aerodynamic conditions including one or more flow properties, the one or more flow properties including at least one of an air pressure, density, energy, Mach number, temperature, or one or more velocity vector components.

Example 4 includes the apparatus of example 1, wherein the donors include a first donor, the donor properties include first donor properties associated with the first donor, and the property assignor to assign the first donor properties to the boundary surfaces of the respective ones of the recipients.

Example 5 includes the apparatus of example 1, wherein the property assignor is to assign the donor properties to the boundary surfaces based on a random pattern.

Example 6 includes the apparatus of example 1, wherein the donors include a first donor having a first model component, a first extraction surface of the extraction surfaces, and first donor properties of the donor properties, the recipients including a first recipient having a second model component and first recipient properties, and further including the property extractor to extract the first donor properties from the first extraction surface, a boundary condition generator to generate a boundary condition at the first extraction surface based on the first donor properties, the property assignor to replace the second model component and the first recipient properties with the boundary condition, and the flow field generator to generate the output flow field based on not simulating the second model component and the first recipient properties.

Example 7 includes the apparatus of example 1, wherein the flow field generator is to execute the computer-based model to simulate aerodynamic fluid flows associated with a flight control surface of an aircraft, the flight control surface including a first actuator and a second actuator, the one or more model regions including the first actuator having a first model component and a second model component and the second actuator having a third model component and a fourth model component, the first model component and the third model component to simulate respective couplings to a pressurized fluid source, the second model component and the fourth model component to simulate respective fluid communications with the aerodynamic fluid flows, and further including a boundary condition generator to determine a donor boundary condition based on the donor properties at a first boundary of the second model component, and determine a recipient boundary condition at a second boundary of the fourth model component, the donor boundary condition and the recipient boundary condition representative of a respective set of computational fluid dynamics constraints at the first boundary and the second boundary, the property assignor to assign the donor boundary condition to the recipient boundary condition, and the flow field generator to generate the output flow field based on (i) not simulating the third model component and (ii) simulating the fourth model component having the donor boundary condition.

Example 8 includes a non-transitory computer readable storage medium comprising instructions that, when executed, cause a machine to at least identify, prior to execution of a computer-based model, donors and recipients representative of one or more model regions of the computer-based model to simulate for a plurality of time steps including a first time step and a second time step, the donors having donor properties, in response to computing a flow field for the first time step of the computer-based model extract the donor properties from extraction surfaces of the donors, and assign the donor properties to boundary surfaces of respective ones of the recipients, and generate an output flow field for the second time step based on the recipients having the assigned donor properties.

Example 9 includes the non-transitory computer readable storage medium of example 8, wherein the instructions, when executed, cause the machine to execute the computer-based model to simulate aerodynamic fluid flows associated with a flight control surface of an aircraft, the flight control surface having actuators to expel a pressurized fluid, and simulate the pressurized fluid affecting the aerodynamic fluid flows proximate the flight control surface.

Example 10 includes the non-transitory computer readable storage medium of example 8, wherein the one or more model regions are representative of one or more simulated portions of a flight control surface of an aircraft, the donor properties representative of aerodynamic conditions proximate the flight control surface, the aerodynamic conditions including one or more flow properties, the one or more flow properties including at least one of an air pressure, density, energy, Mach number, temperature, or one or more velocity vector components.

Example 11 includes the non-transitory computer readable storage medium of example 8, wherein the donors include a first donor, the donor properties include first donor properties associated with the first donor, and the instructions, when executed, cause the machine to assign the first donor properties to the boundary surfaces of the respective ones of the recipients.

Example 12 includes the non-transitory computer readable storage medium of example 8, wherein the instructions, when executed, cause the machine to assign the donor properties to the boundary surfaces based on a random pattern.

Example 13 includes the non-transitory computer readable storage medium of example 8, wherein the donors include a first donor having a first model component, a first extraction surface of the extraction surfaces, and first donor properties of the donor properties, the recipients including a first recipient having a second model component and first recipient properties, and the instructions, when executed, cause the machine to extract the first donor properties from the first extraction surface, generate a boundary condition at the first extraction surface based on the first donor properties, replace the second model component and the first recipient properties with the boundary condition, and generate the output flow field based on not simulating the second model component and the first recipient properties.

Example 14 includes the non-transitory computer readable storage medium of example 8, wherein the computer-based model is to simulate aerodynamic fluid flows associated with a flight control surface of an aircraft, the flight control surface including a first actuator and a second actuator, the one or more model regions including the first actuator having a first model component and a second model component and the second actuator having a third model component and a fourth model component, the first model component and the third model component to simulate respective couplings to a pressurized fluid source, the second model component and the fourth model component to simulate respective fluid communications with the aerodynamic fluid flows, and the instructions, when executed, cause the machine to determine a donor boundary condition based on the donor properties at a first boundary of the second model component, and determine a recipient boundary condition at a second boundary of the fourth model component, the donor boundary condition and the recipient boundary condition representative of a respective set of computational fluid dynamics constraints at the first boundary and the second boundary, assign the donor boundary condition to the recipient boundary condition, and generate the output flow field based on (i) not simulating the third model component and (ii) simulating the fourth model component having the donor boundary condition.

Example 15 includes a method to improve execution of a computer-based model, the method comprising identifying, prior to execution of the computer-based model, donors and recipients representative of one or more model regions of the computer-based model to simulate for a plurality of time steps including a first time step and a second time step, the donors having donor properties, in response to computing a flow field for the first time step of the computer-based model extracting the donor properties from extraction surfaces of the donors, and assigning the donor properties to boundary surfaces of respective ones of the recipients, and generating an output flow field for the second time step based on the recipients having the assigned donor properties.

Example 16 includes the method of example 15, wherein the computer-based model is to simulate aerodynamic fluid flows associated with a flight control surface of an aircraft, the flight control surface having actuators to expel a pressurized fluid, and the computer-based model is to simulate the pressurized fluid affecting the aerodynamic fluid flows proximate the flight control surface.

Example 17 includes the method of example 15, wherein the one or more model regions are representative of one or more simulated portions of a flight control surface of an aircraft, the donor properties representative of aerodynamic conditions proximate the flight control surface, the aerodynamic conditions including one or more flow properties, the one or more flow properties including at least one of an air pressure, density, energy, Mach number, temperature, or one or more velocity vector components.

Example 18 includes the method of example 15, wherein the donors include a first donor, the donor properties include first donor properties associated with the first donor, and further including assigning the first donor properties to the boundary surfaces of the respective ones of the recipients.

Example 19 includes the method of example 15, wherein the assigning of the donor properties to the boundary surfaces is based on a random pattern.

Example 20 includes the method of example 15, wherein the donors include a first donor having a first model component, a first extraction surface of the extraction surfaces, and first donor properties of the donor properties, the recipients including a first recipient having a second model component and first recipient properties, and further including extracting the first donor properties from the first extraction surface, generating a boundary condition at the first extraction surface based on the first donor properties, replacing the second model component and the first recipient properties with the boundary condition, and generating the output flow field based on not simulating the second model component and the first recipient properties.

Example 21 includes the method of example 15, wherein the computer-based model is to simulate aerodynamic fluid flows associated with a flight control surface of an aircraft, the flight control surface including a first actuator and a second actuator, the one or more model regions including the first actuator having a first model component and a second model component and the second actuator having a third model component and a fourth model component, the first model component and the third model component to simulate respective couplings to a pressurized fluid source, the second model component and the fourth model component to simulate respective fluid communications with the aerodynamic fluid flows, and further including determining a donor boundary condition based on the donor properties at a first boundary of the second model component, determining a recipient boundary condition at a second boundary of the fourth model component, the donor boundary condition and the recipient boundary condition representative of a respective set of computational fluid dynamics constraints at the first boundary and the second boundary, assigning the donor boundary condition to the recipient boundary condition, and generating the output flow field based on (i) not simulating the third model component and (ii) simulating the fourth model component having the donor boundary condition.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for execution of a computer-based model, the apparatus comprising:
   machine-readable instructions;
   at least one processor circuit to execute the machine-readable instructions to:
      prior to execution of the computer-based model, identify a donor and a recipient representative of one or more model regions of the computer-based model to simulate for a plurality of time steps including a first time step and a second time step, the donor having donor properties and a first model component, the recipient having recipient properties and a second model component;
      in response to computing a flow field for the first time step of the computer-based model, extract the donor properties from an extraction surface of the donor;
      generate a boundary condition at the extraction surface based on the donor properties;
      replace at least one of the second model component or the recipient properties with the boundary condition; and
      generate an output flow field for the second time step based on a simulation of the second model component with the boundary condition.

2. The apparatus of claim 1, wherein one or more of the at least one processor circuit is to execute the computer-based model to:
   simulate aerodynamic fluid flows associated with a flight control surface of an aircraft, the flight control surface having actuators to expel a pressurized fluid; and
   simulate the pressurized fluid affecting the aerodynamic fluid flows proximate the flight control surface.

3. The apparatus of claim 1, wherein the one or more model regions are representative of one or more simulated portions of a flight control surface of an aircraft, the donor properties representative of aerodynamic conditions proximate the flight control surface, the aerodynamic conditions including one or more flow properties, the one or more flow properties including at least one of an air pressure, density, energy, Mach number, temperature, or one or more velocity vector components.

4. The apparatus of claim 1, wherein the donor is a first donor, the donor properties include first donor properties associated with the first donor, and the first donor properties are to be assigned to boundary surfaces of the recipient.

5. The apparatus of claim 1, wherein one or more of the at least one processor circuit is to assign the donor properties to boundary surfaces of the recipient based on a random pattern.

6. The apparatus of claim 1, wherein the
   one or more of the at least one processor circuit is to replace the second model component and the recipient properties with the boundary condition.

7. The apparatus of claim 1, wherein one or more of the at least one processor circuit is to execute the computer-based model to simulate aerodynamic fluid flows associated with a flight control surface of an aircraft, the flight control surface including a first actuator and a second actuator, the one or more model regions including the first actuator having a first model component and a second model component and the second actuator having a third model component and a fourth model component, the first model component and the third model component to simulate respective couplings to a pressurized fluid source, the second model component and the fourth model component to simulate respective fluid communications with the aerodynamic fluid flows, and
   and wherein one or more of the at least one processor circuit is to further:
      determine a donor boundary condition based on the donor properties at a first boundary of the second model component; and
      determine a recipient boundary condition at a second boundary of the fourth model component, the donor boundary condition and the recipient boundary condition representative of a respective set of computational fluid dynamics constraints at the first boundary and the second boundary; and
      assign the donor boundary condition to the recipient boundary condition
      wherein the output flow field is generated further based on simulating the fourth model component having the donor boundary condition.

8. A non-transitory computer readable storage medium comprising instructions that, when executed, cause at least one processor circuit to:
- identify, prior to execution of a computer-based model, a donor and a recipient representative of one or more model regions of the computer-based model to simulate for a plurality of time steps including a first time step and a second time step, the donor having donor properties and a first model component, the recipient having recipient properties and a second model component;
- in response to computing a flow field for the first time step of the computer-based model, extract the donor properties from an extraction surface of the donor;
- generate a boundary condition at the extraction surface based on the donor properties;
- replace at least one of the second model component or the recipient properties with the boundary condition; and
- generate an output flow field for the second time step based on a simulation of the second model component with the boundary condition.

9. The non-transitory computer readable storage medium of claim 8, wherein the instructions, when executed, cause one or more of the at least one processor circuit to execute the computer-based model to:
- simulate aerodynamic fluid flows associated with a flight control surface of an aircraft, the flight control surface having actuators to expel a pressurized fluid; and
- simulate the pressurized fluid affecting the aerodynamic fluid flows proximate the flight control surface.

10. The non-transitory computer readable storage medium of claim 8, wherein the one or more model regions are representative of one or more simulated portions of a flight control surface of an aircraft, the donor properties representative of aerodynamic conditions proximate the flight control surface, the aerodynamic conditions including one or more flow properties, the one or more flow properties including at least one of an air pressure, density, energy, Mach number, temperature, or one or more velocity vector components.

11. The non-transitory computer readable storage medium of claim 8, wherein the the donor is a first donor, the donor properties include first donor properties associated with the first donor, and the instructions, when executed, cause one or more of the at least one processor circuit to assign the first donor properties to boundary surfaces of the recipient.

12. The non-transitory computer readable storage medium of claim 8, wherein the instructions, when executed, cause one or more of the at least one processor circuit to replace the at least one of the second model component or the recipient properties with the boundary condition based on a random pattern.

13. The non-transitory computer readable storage medium of claim 8, wherein
the second model component and the first recipient properties are replaced with the boundary condition.

14. The non-transitory computer readable storage medium of claim 8, wherein the computer-based model is to simulate aerodynamic fluid flows associated with a flight control surface of an aircraft, the flight control surface including a first actuator and a second actuator, the one or more model regions including the first actuator having a first model component and a second model component and the second actuator having a third model component and a fourth model component, the first model component and the third model component to simulate respective couplings to a pressurized fluid source, the second model component and the fourth model component to simulate respective fluid communications with the aerodynamic fluid flows, and the instructions, when executed, cause one or more of the at least one processor circuit to:
- determine a donor boundary condition based on the donor properties at a first boundary of the second model component;
- determine a recipient boundary condition at a second boundary of the fourth model component, the donor boundary condition and the recipient boundary condition representative of a respective set of computational fluid dynamics constraints at the first boundary and the second boundary; and
- assign the donor boundary condition to the recipient boundary condition, wherein
- the output flow field is generated further based on simulating the fourth model component having the donor boundary condition.

15. A method for execution of a computer-based model, the method comprising:
- identifying, prior to execution of the computer-based model, a donor and a recipient representative of one or more model regions of the computer-based model to simulate for a plurality of time steps including a first time step and a second time step, the donor having donor properties and a first model component, the recipient having recipient properties and a second model component;
- in response to computing a flow field for the first time step of the computer-based model, extracting the donor properties from an extraction surface of the donor;
- generating a boundary condition at the extraction surface based on the donor properties; and
- replacing at least one of the second model component or the recipient properties with the boundary condition; and
- generating an output flow field for the second time step based on a simulation of the second model component with the boundary condition.

16. The method of claim 15, wherein the computer-based model is to simulate aerodynamic fluid flows associated with a flight control surface of an aircraft, the flight control surface having actuators to expel a pressurized fluid, and the computer-based model is to simulate the pressurized fluid affecting the aerodynamic fluid flows proximate the flight control surface.

17. The method of claim 15, wherein the one or more model regions are representative of one or more simulated portions of a flight control surface of an aircraft, the donor properties representative of aerodynamic conditions proximate the flight control surface, the aerodynamic conditions including one or more flow properties, the one or more flow properties including at least one of an air pressure, density, energy, Mach number, temperature, or one or more velocity vector components.

18. The method of claim 15, wherein the donor is a first donor, the donor properties including first donor properties associated with the first donor, and further including assigning the first donor properties to boundary surfaces of the recipient.

19. The method of claim 15, wherein the replacement of the at least one of the second model component or the recipient properties with the boundary condition is based on a random pattern.

20. The method of claim 15, wherein
the second model component and the recipient properties are replaced with the boundary condition.

21. The method of claim 15, wherein the computer-based model is to simulate aerodynamic fluid flows associated with a flight control surface of an aircraft, the flight control surface including a first actuator and a second actuator, the one or more model regions including the first actuator having a first model component and a second model component and the second actuator having a third model component and a fourth model component, the first model component and the third model component to simulate respective couplings to a pressurized fluid source, the second model component and the fourth model component to simulate respective fluid communications with the aerodynamic fluid flows, and further including:
- determining a donor boundary condition based on the donor properties at a first boundary of the second model component;
- determining a recipient boundary condition at a second boundary of the fourth model component, the donor boundary condition and the recipient boundary condition representative of a respective set of computational fluid dynamics constraints at the first boundary and the second boundary;
- assigning the donor boundary condition to the recipient boundary condition; and
- generating the output flow field based on simulating the fourth model component having the donor boundary condition.

\* \* \* \* \*

UNITED STATES PATENT AND TRADEMARK OFFICE
CERTIFICATE OF CORRECTION

PATENT NO. : 12,265,766 B2
APPLICATION NO. : 17/219104
DATED : April 1, 2025
INVENTOR(S) : Shmilovich et al.

Page 1 of 1

It is certified that error appears in the above-identified patent and that said Letters Patent is hereby corrected as shown below:

In the Claims

Column 40, Claim 7, Line 51, Delete "and".
Column 41, Claim 11, Line 41, Delete "the".

Signed and Sealed this
Twenty-ninth Day of July, 2025

Coke Morgan Stewart
*Acting Director of the United States Patent and Trademark Office*